US009760545B2

(12) United States Patent
Quintana

(10) Patent No.: US 9,760,545 B2
(45) Date of Patent: Sep. 12, 2017

(54) METHOD AND SYSTEM FOR DELINEATING AND ACCESSING MULTI-TAGGED LITERATURE

(71) Applicant: Lisa Quintana, Boulder Creek, CA (US)

(72) Inventor: Lisa Quintana, Boulder Creek, CA (US)

( * ) Notice: Subject to any disclaimer, the term of this patent is extended or adjusted under 35 U.S.C. 154(b) by 244 days.

(21) Appl. No.: 13/725,977

(22) Filed: Dec. 21, 2012

(65) Prior Publication Data

US 2014/0181647 A1    Jun. 26, 2014

(51) Int. Cl.
*G06F 17/21* (2006.01)
*G06F 17/24* (2006.01)
*G06F 3/0482* (2013.01)

(52) U.S. Cl.
CPC .......... *G06F 17/218* (2013.01); *G06F 17/211* (2013.01); *G06F 17/241* (2013.01); *G06F 3/0482* (2013.01)

(58) Field of Classification Search
CPC .. G06F 17/24; G06F 17/211; G06F 17/30884; G06F 17/2235; G06F 17/2745; G06F 17/30014; G06F 17/30598; G06F 17/241; G06F 3/0482
See application file for complete search history.

(56) References Cited

U.S. PATENT DOCUMENTS

| 6,687,699 | B1* | 2/2004 | Courey, Jr. | ........ G06F 17/30958 |
| 8,635,520 | B2* | 1/2014 | Christiansen | ......... G06F 17/241 |
| | | | | 715/230 |
| 2008/0276188 | A1* | 11/2008 | Zerger | .......................... 715/764 |
| 2009/0132234 | A1* | 5/2009 | Weikel | .............................. 704/3 |
| 2012/0079372 | A1* | 3/2012 | Kandekar et al. | ............ 715/256 |
| 2012/0173659 | A1* | 7/2012 | Thaxter et al. | ................ 709/217 |
| 2012/0320416 | A1* | 12/2012 | Mbenkum | ......... G06F 17/30884 |
| | | | | 358/1.15 |

* cited by examiner

*Primary Examiner* — Wilson Tsui
(74) *Attorney, Agent, or Firm* — Patrick Reilly

(57) ABSTRACT

The present invention provides a way of parsing into tagged segments of texts and therefrom accessing multi-tagged literature. Multi-tagged literature comprises multiple narrative threads that may each occur simultaneously within a narrative or historical timeline, thereby allowing the reader to switch back and forth between various aspects of a text and optionally follow separate threads. In certain versions, the invented system includes an editing interface and a reader software. The editing interface allows for the manipulation of both imported text, newly input and/or newly authored text, and enables a user to populate a file with the text in combination with functional software code. The reader software directs the ebook display device to both render the text and allow the user to traverse the text in a variety of ways as directed by input to the ebook display device of commands and selections.

24 Claims, 22 Drawing Sheets

TAG TO LABEL TABLE 1700

| PAIRID.01 | 1502 | T.01 |
|---|---|---|
| PAIRID.02 | TAB 1502A | T.02 |
| PAIRID.03 | TAB 1506 | NEXT SEGMENT RECORD |
| PAIRID.04 | TAB 1500 | T.04 |
| PAIRID.05 | CHAR.6 | T.05 |
| PAIRID.06 | TAB 1502C | T.06 |
| PAIRID.07 | TAB 1504 | PREVIOUS SEGMENT RECORD |
| PAIRID.08 | PREVIOUS | T.08 |
| PAIRID.09 | LOC.2 | T.09 |
| PAIRID.10 | CHAR.3 | T.10 |
| PAIRID.11 | TAB 1502B | T.BILL |
| PAIRID.DEF | LABEL.DEF | T.DEF |

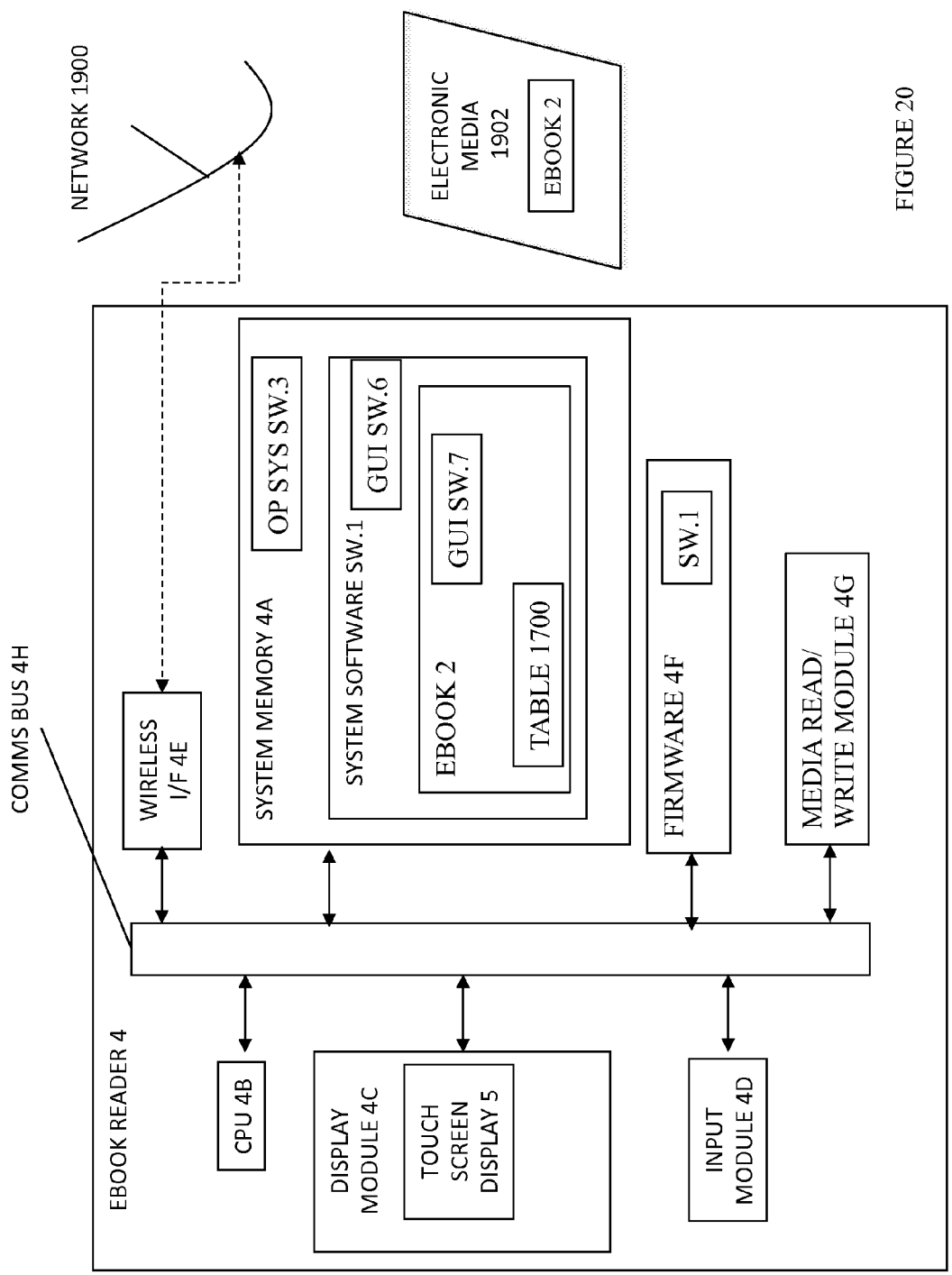

METHOD AND SYSTEM FOR DELINEATING AND ACCESSING MULTI-TAGGED LITERATURE

FIELD OF THE INVENTION

The present invention relates to the generation, parsing, modification, structure and structuring of electronically stored digitized text. More particularly, the present invention relates to digitized textual documents and methods and devices for organizing, rendering and experiencing segments within a digitized text, of either a newly generated or a previously authored document, e.g., an ebook, along two or more distinguishable threads of organization of the segments or subsets of segments of the text.

BACKGROUND OF THE INVENTION

The market for supply channels of digitized copies of textual documents or "ebooks", is presently well established in both domestic and international channels of commerce. Yet the prior art merely offers essential access to each ebook by presenting a single narrative line in simulation of the typical method of reading a hard copy text from front page to last page. While prior art ebook readers do allow a reader to (a.) record electronic bookmarks within an ebook, (b.) peruse an ebook on the basis of page number or key word selection, (c.) jump from page to page, and (d.) activate hyperlinks to move from one point to another point within an ebook, the prior art wholly fails to optimize the possibilities of offering two or more alternate narrative threads through a same ebook.

There is therefore a long felt need to provide a method and device to establish two or more threads of separately associated segments which a reader may selectively follow while accessing an ebook.

SUMMARY OF THE INVENTION

Toward this and other objects that are made obvious in light of the disclosure, a method and system are provided for separating a digitized textual document into a plurality of textual segments, wherein each textual segment (hereinafter, "segments") may be associated with one or more unique tags. One or more pluralities of segments may be associated with unique tags, wherein a first plurality of segments may be defined by associating each segment of the first plurality of segments with a first tag, and additional pluralities of segments are each defined by associating each segment of the particular plurality of segments with a unique and distinguishable tag. For example, a subset of segments of a source document may be selected out and each associated with a particular character. This exemplary subset of segments may, in an exemplary but not limited method, be associated with a common tag that represents an association with this particular character.

Additionally and optionally the segments may be further assigned sequence numbers that order each segment along a one-dimensional order wherein no two sequence numbers are equal, i.e., in a comparison of any two sequence numbers one sequence number will indicate an earlier relative position of the associated segment within the sequence of segments and the other sequence number of the other segment will indicate a later relative position within the sequence of segments.

Segments may be associated with tags that includes various literary qualities and aspects, such as, but not limited to, one or more characters, narrators, points of view, scenes, moments in time, locales, themes, object, and/or other suitable literary aspects or qualities.

It is understood that the digitized textual document may be a digitized representation of a previously written text, e.g., "Ulysses" by James Joyce, or may be a newly authored work that is separated into segments and organized with two or more distinguishable pluralities of uniquely and differently tagged segments.

Two or more segments may include references to scenes and time line moments, wherein two or more segments may be associated with a same scene at a same time line moments, but might also each be disparately associated with different aspects of the source text, such as point of view, character or theme. Alternately or additionally, two or more segments may be associated with two or more different aspects of the source text.

When the segments are stored as segments records and tags are associated with at least two or more segments records, one or more software nodes may be instantiated at run time and/or stored within node records in electronic memory. Nodes are data structures that are associated with at least one segment record and are applied to, among other uses, to determine when two segments are associated with a same tag. For example, when two segments are each separately associated with a different character but are also tagged as being related to a same scene in a plot timeline, a node may be generated that comprises references to the scene, to both characters, and to the two segments.

According to a second aspect of the method of the present invention (hereinafter, the "invented method"), an editing system comprising an editor software is provided that enables a human editor to define and populate segment records and separate a textual document into segments having different tags or different combinations of tags.

According to a third aspect of the invented method, an ebook rendering device (hereinafter, the "ebook device") comprising a reader software is provided that enables a human reader to select a thread of segments wherein each segment of a selected thread is associated with a same tag. The ebook device may be directed by the human reader to (a.) sequentially render each segment of a selected thread; (b.) selectively render two or more segments associated with a same node; (c.) select which tag from a plurality of tags to follow in order to sequentially render segments in accordance with a predefined thread of segments; and/or (d.) enable a human reader to select or input an aspect of the textual document to apply to the pluralities of segments and select a plurality of segments on the criterion of association with the selected or input aspect of the digitized document. The selected or input aspect of the digitized document might be a character, a setting, a reference to a point within a timeline, a theme, a locale, a dialogue, and/or or a literary quality.

According to a fourth aspect of the invented method, one or more segments might be associated with more than one tag, and some or all of the text of a segment might also be comprised within an additional segment or segment record.

According to a fifth aspect of the invented method, a software structure is established wherein a plurality of nodes are interrelated and each segment is associated with at least one node. The nodes may be generated in a compilation or execution performed in light of the associations of the segments and may optionally or alternately generated at a runtime of a software program.

Optionally or additionally one or more nodes may be linked to or associated with two or more associated segments. For example, a node may enable a fictional same scene in a novel to be explicated from both (a.) a first point of view of a narrator, and (b.) a second point of view of a character who is portrayed as being present within the same scene. The invented ebook reader device may optionally enable the human reader to access two or more segments that are with a same node wherein these segments may be further associated with different tags, e.g., character tags. For example, the human reader may enjoy perusing the different points of view of different characters related to a same scene and within the general plot line or narrative of the source digitized textual document.

According to a fifth optional aspect of the invented method, a non-transitory computer-readable medium is provided that enables the ebook device to render segments in accordance with one or more aspects of the invented method.

BRIEF DESCRIPTION OF THE FIGURES

FIG. 20 is a schematic diagram of an ebook reader.

DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
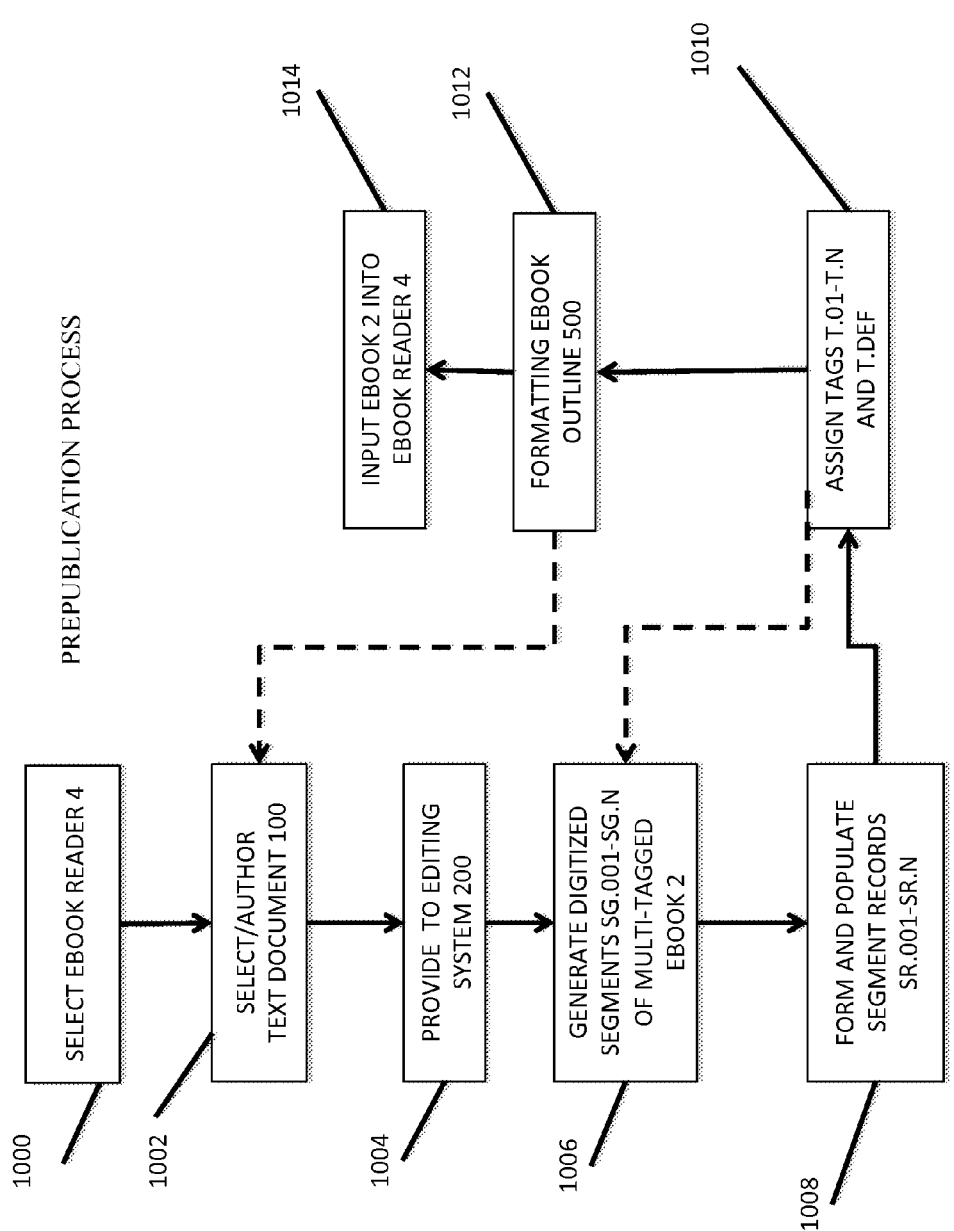
FIG. 1 is a process chart of a first invented method of generating an outline of a multi-tagged ebook.

Referring now generally to the Figures and particularly to FIG. 1, FIG. 1 is a process chart of a first invented method of generating a multi-tagged ebook 2 that may be rendered by an invented ebook 4. In step 1000 the process of generating a multi tagged ebook 2 is initiated by selecting the invented ebook reader 4. In step 1002 either an existing text is digitized or digitized text is generated and selected as a digitized source text 100 (hereinafter, "source text" 100). The source text 100 of step 1002 is then input into an editing system 200 by direct keyboard input, or by download from an electronics communications network, e.g., the Internet, or by upload from a computer medium, e.g., a digital memory stick or a digital memory disc. A human editor (hereinafter, "editor") applies the editing system 200 in step 1006 to generate a plurality of digitized textual segments SG.001-SG.N (hereinafter, "segments" SG.001-SG.N) selected from the source text 100. It is understood that elements of the source text 100 may be duplicated in more than one derivative segment SG.001-SG.N. In response to interaction with the editor, the editing system 200 forms separate segment records SR.001-SR.N in step 1008, wherein each segment record SR.001-SR.N preferably contains at least one segment SG.001-SG.N. The editor assigns one or more tags T.01-T.N & T.DEF to one or more segment records SR.001-SR.N in step 1010. The editor preferably, but optionally, alternatively or additionally, assign a unique sequence number SEQ.001 to SEQ.N to each segment record SR.001-SR.N, whereby each segment record SR.001-SR.N has a unique segment number SEQ.001-SEQ.N that orders the segments according to a one-dimensional sequence wherein no two segment records SR.001-SR.N have the same sequence number SEQ.001-SEQ.N and each SEQ,001-SEQ.N relates a specific and unique position within the one-dimensional hierarchical structure of the one-dimensional sequence.

The significance and utility of the invented method of the tags T.01-T.N and the segment records SR.001-SR.N will be further explicated in the present disclosure. Examples of aspects of the source text 100 that may be indicated by tags are scene, moment within a time line, character point of view, narrative thread, theme, alternate plot line, alternate time line and/or other suitable literary quality known in the art.

It is understood that the steps of 1006 through 1010 may be accomplished as repeated loops, or as iterative loops, as may also be the case of steps 1002 through 1012.

A pre-publication, formatted ebook outline 500 is thereupon generated in step 1012, wherein the ebook outline 500 includes all of the segments SG.001-SG.N and segment records SR.001-SR.N generated in one or more execution of the steps of 1002 through 1012, wherein one or more segment records SR.001-SR.N may be revised or deleted in this prepublication process. It is understood that the steps of 1006 through 1010 may be accomplished as repeated loops, or as iterative loops, as may also be the case of steps 1002 through 1012. In step 1014 the invented ebook 2 is inputted into the ebook reader 4. It is further understood that graphics and additional digitized textual data may be linked with or added to the ebook outline 500 or one or more segment records SR.001-SR.N in one or more executions of step 1008.

Figure 2:
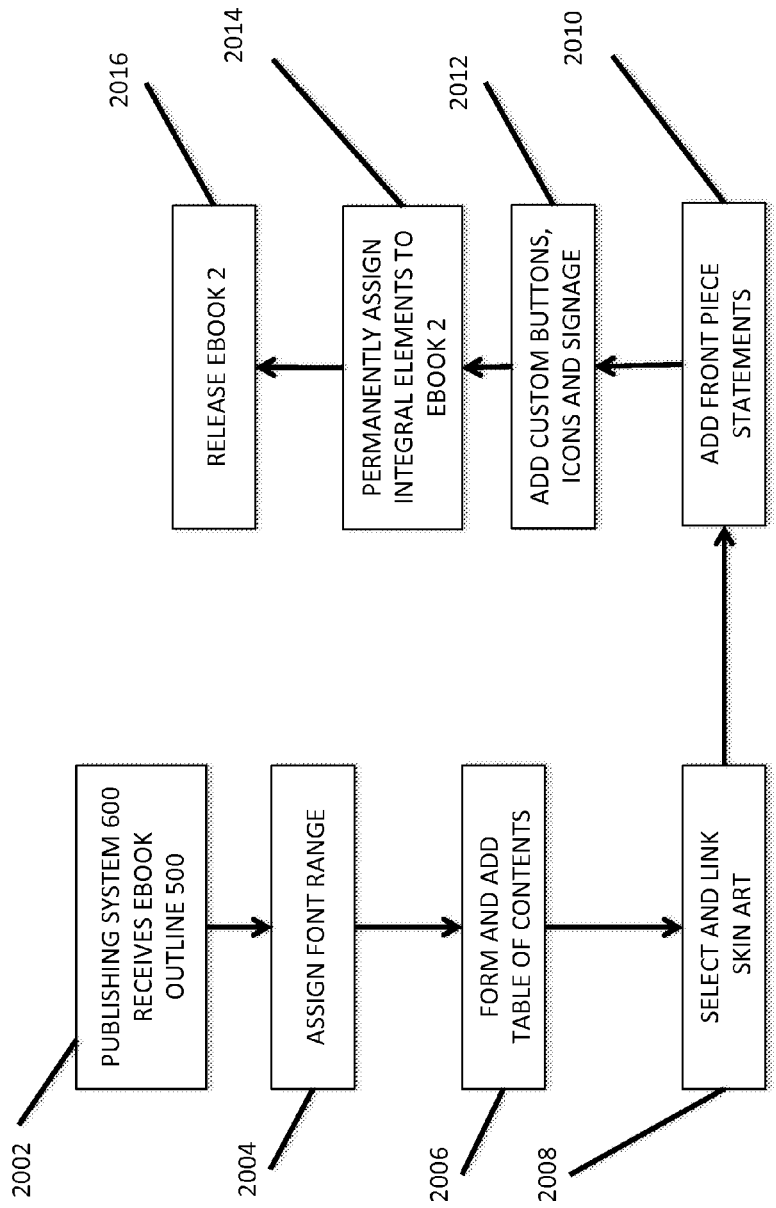
FIG. 2 is a process chart of a first invented method of preparing a multi-tagged ebook for publication.

Referring now to FIG. 2, FIG. 2 is a process chart of a publication process. The ebook outline 500 is received by a publishing system 600 in step 2002. A font range is assigned to the ebook outline 500 in step 2004 and a table of contents is formed and added to the ebook outline 500 in step 2006. Preferably, a human publisher (hereinafter, "publisher") selects and links skin art to the ebook outline 500 in step 2008 and frontispiece statements, e.g., copyright, publisher identification and address, ISBN and publication data, is added to the ebook outline 500 in step 2010. Customized and/or standardized buttons, icons and signage are added to the ebook outline 500 in step 2012. The publisher then permanently selects, signifies and assigns integral elements of the ebook outline 500 in step 2014. The invented ebook 2 is then released in step 2016 for commercial or public distribution in step 2016 through electronic media and/or electronic communications networks, e.g., the Internet.

Figure 3:
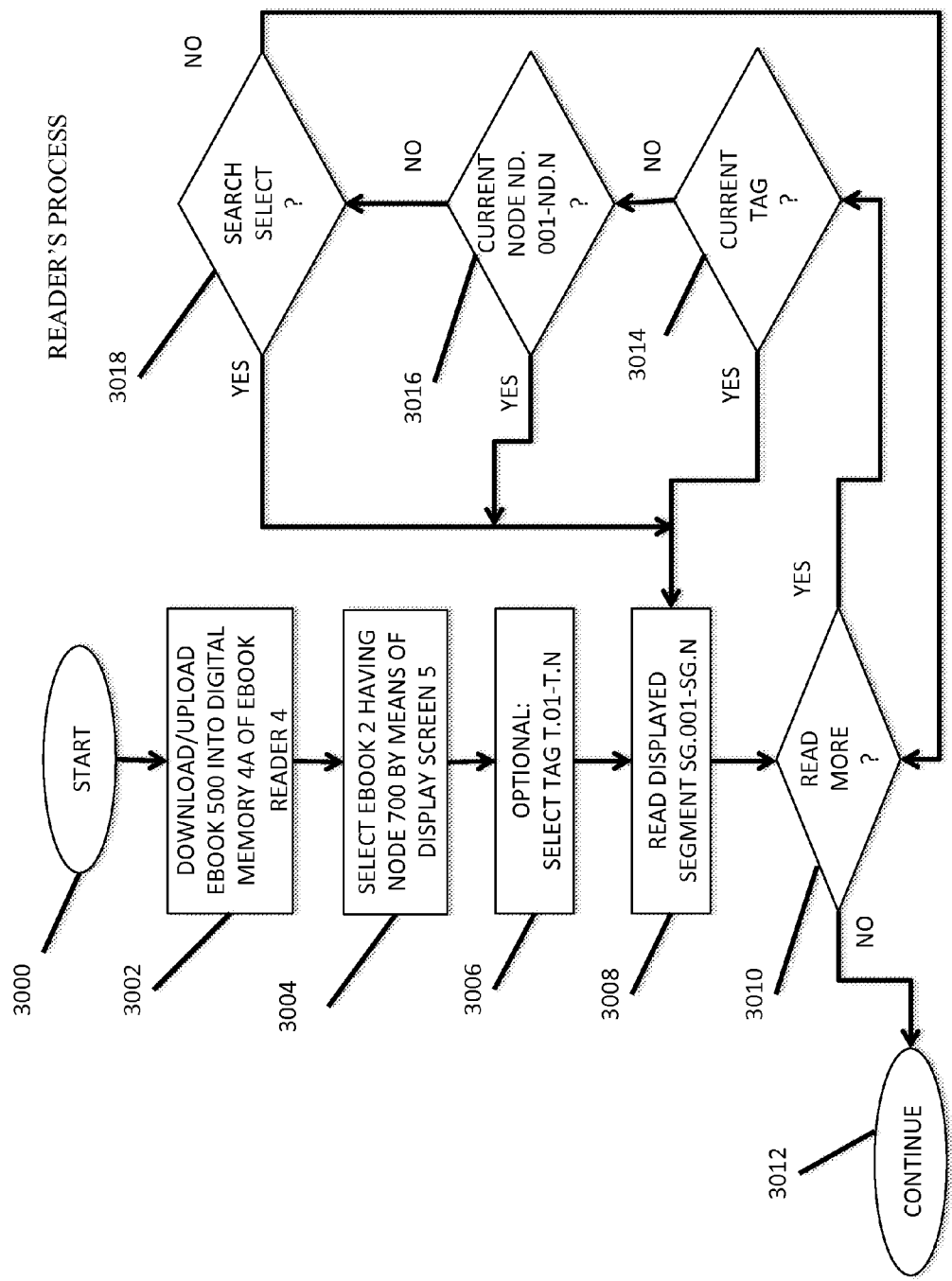
FIG. 3 is a is a process chart of a first preferred embodiment of a user experience in reading the invented ebook of FIG. 2.

Referring now to FIG. 3, FIG. 3 is a process chart of a human reader's access of the invented ebook 2 by means of an ebook reader 4 having a touch display screen 5. It is understood that the ebook reader 4 may be a general purpose computer, e.g., a tablet, laptop or desktop computer, that is configured with an invented ebook reader software SW.1, or a special purpose ebook reader, such as a KINDLE™ or Nook™ ebook reader. The human reader (hereinafter, "reader") downloads or uploads the ebook 2 into a digital memory 4A of the ebook reader 4 in step 3002 and directs the ebook reader in step 3004 to initiate visual and/or auditory rendering of the invented ebook.

It is further understood that the nodes ND.001-ND.N of the ebook 2 might be recorded as node records 700 and stored in the ebook reader 4 and/or alternatively or optionally generated at run time by the ebook reader 4 and after receipt by the ebook reader 4 of a user selection command of the ebook 2 of step 3004.

In optional step 3006, the reader directs the ebook reader 4 to follow a tag T.01-T.N as selected by the reader in order to provide a user directed nodal pathway through the invented ebook 2. In the alternative, the ebook reader 4 will follow a default nodal pathway through the invented ebook reader 4 when the reader makes no tag T.01-T.N selections by selecting segments records SR.001-SR.N that each include a default tag T.DEF in an order determined by the sequence numbers SEQ.001-SEQ.N and sequentially rendering the segments SG.001-SG.N of these segment records SR.001-SR.N that include the default tag T.DEF.

In the reading process loop of step 3010 through step 3018, the reader may direct the ebook reader 4 to proceed from step 3010 to step 3012 to exit the reading process loop 3010 through 3018 and proceed on to alternate computational operations. Alternatively, the reader may instruct the ebook reader 4 to proceed to iteratively render successive segment records SR.001-SR.N as accessed in accordance with a tag selection, or default tag selection, of step 3006. In the alternative, the reader in step 3014 may select an alternate tag T.01-T.N. or an alternate segment record SR.001-SR.N associated with a current node ND.001-ND.N may be selected by the reader in step 3016, or an alternate tag T.01-T.N or alternate node ND.001-ND.N may be selected by the reader in a search process of step 3018.

Figure 4:
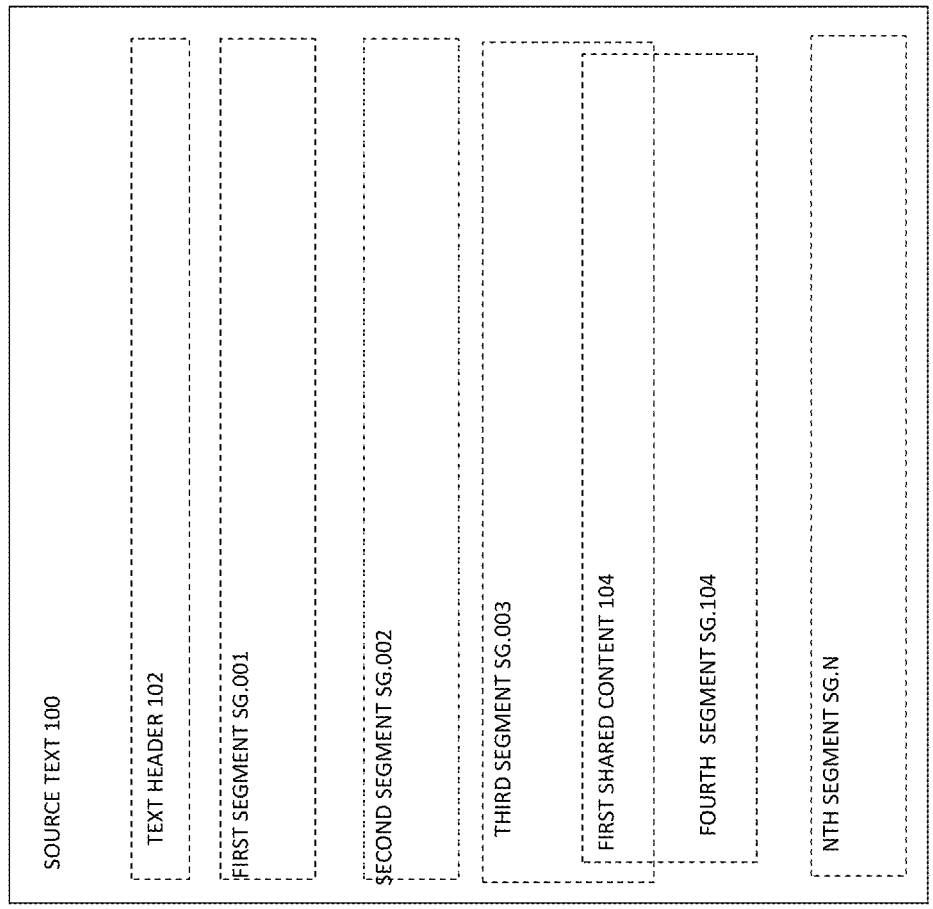
FIG. 4 is a representation of a digitized text of FIG. 1 divided into segments.

Referring now to FIG. 4, the source text 100 is illustrated as including a header 102 and being divided into segment SG.104 through Nth segment SG.N, wherein N may be as large as the total count of distinguishable words or characters of the source text 100. It is noted that content of the source text 100 may be shared by, or duplicated within, one or more segments SG.104 through SG.N, as illustrated by first shared content 104.

Figure 5:
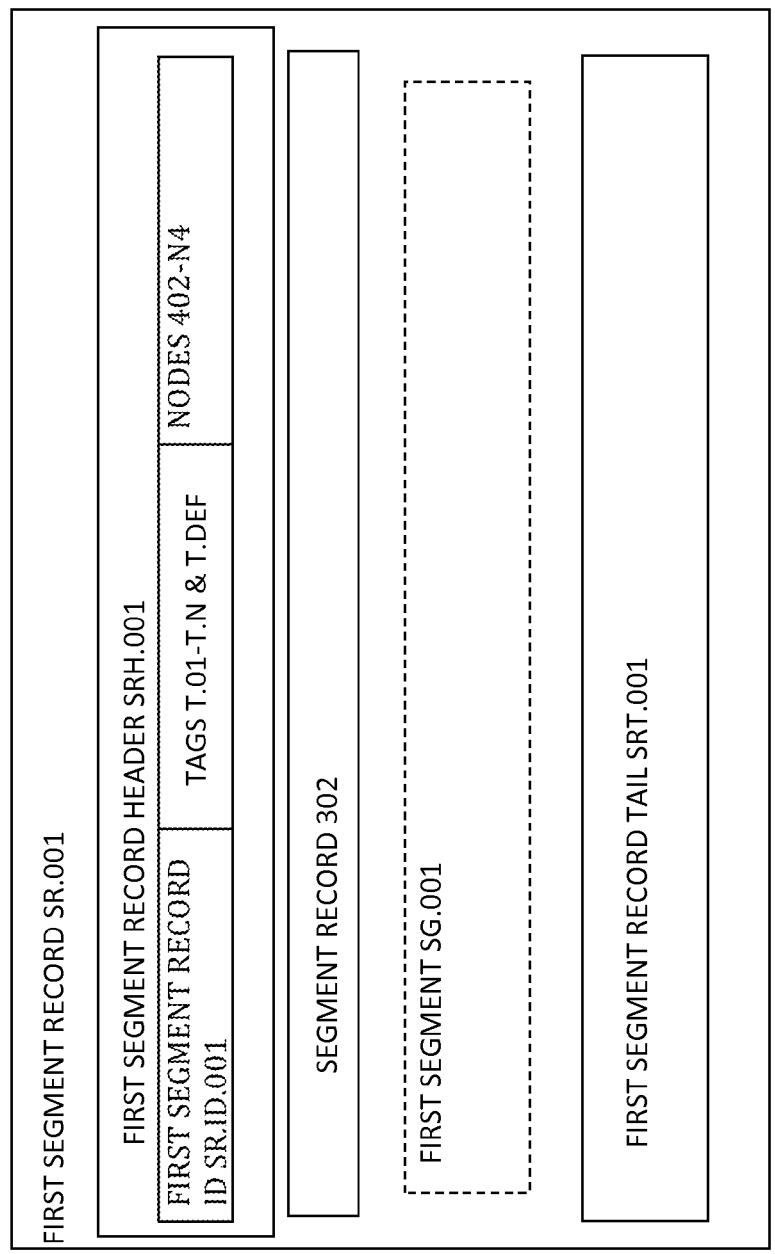
FIG. 5 is a schematic diagram of an exemplary first segment record in which a first segment of FIG. 3 of the invented ebook is comprised.

Referring now to FIG. 5, FIG. 5 is an illustration of an exemplary first segment record 302 that includes a first segment record header SRH.001, the first segment SG.001 of the source text 100, and a first segment record tail SRT.001. The first segment record header SRH.001 includes a first segment record identifier SR.ID.001, the default tag T.DEF, and one or more tags T.01-T.N associated by the editor with the first segment SG.001, and a sequence number SEQ.001 assigned by the editor. The exemplary first record 302 may optionally further include references to one or more nodes ND.001-ND.N that are associated with the first segment record 302. The optional first segment record tail SRT.001. contains data useful in managing and transmitting the first segment record SR.001.

Figure 6:
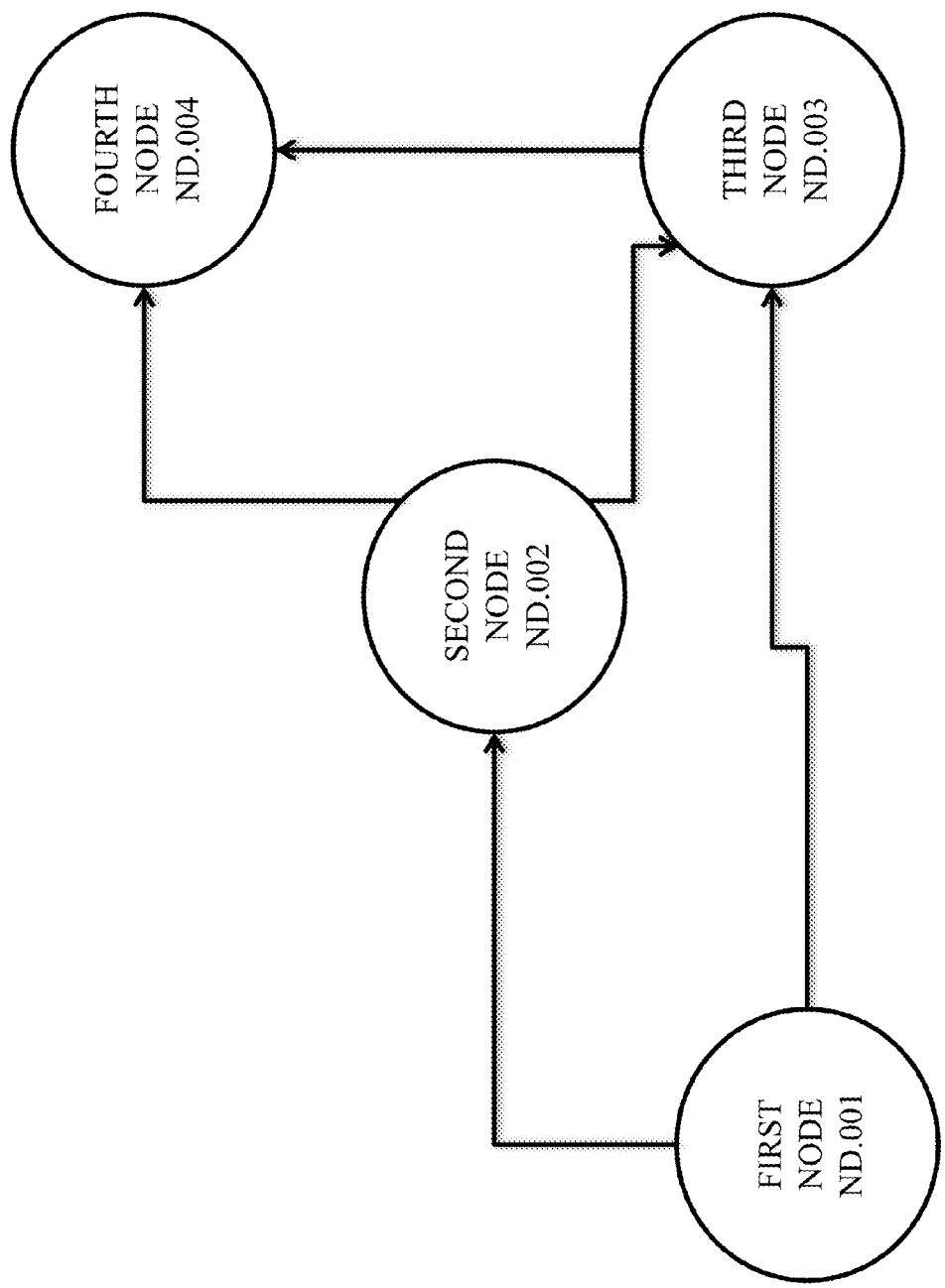
FIG. 6 is a schematic of node diagram that is organized in accordance with the invented ebook of FIGS. 1, 2 and 3 and a plurality of segment records of FIG. 4.

Referring now to FIG. 6, FIG. 6 is an entity diagram of four nodes ND.001-ND.004 of the plurality of nodes ND.001-ND.N. The plurality of nodes ND.001-ND.N are instantiated and generated upon the basis of a query generated by a user in step 3006 of FIG. 3, or alternatively by a default selection of the ebook reader software SW.1 when the reader does not select a tag T.01-T.N in step 3306 or later.

Figure 7:
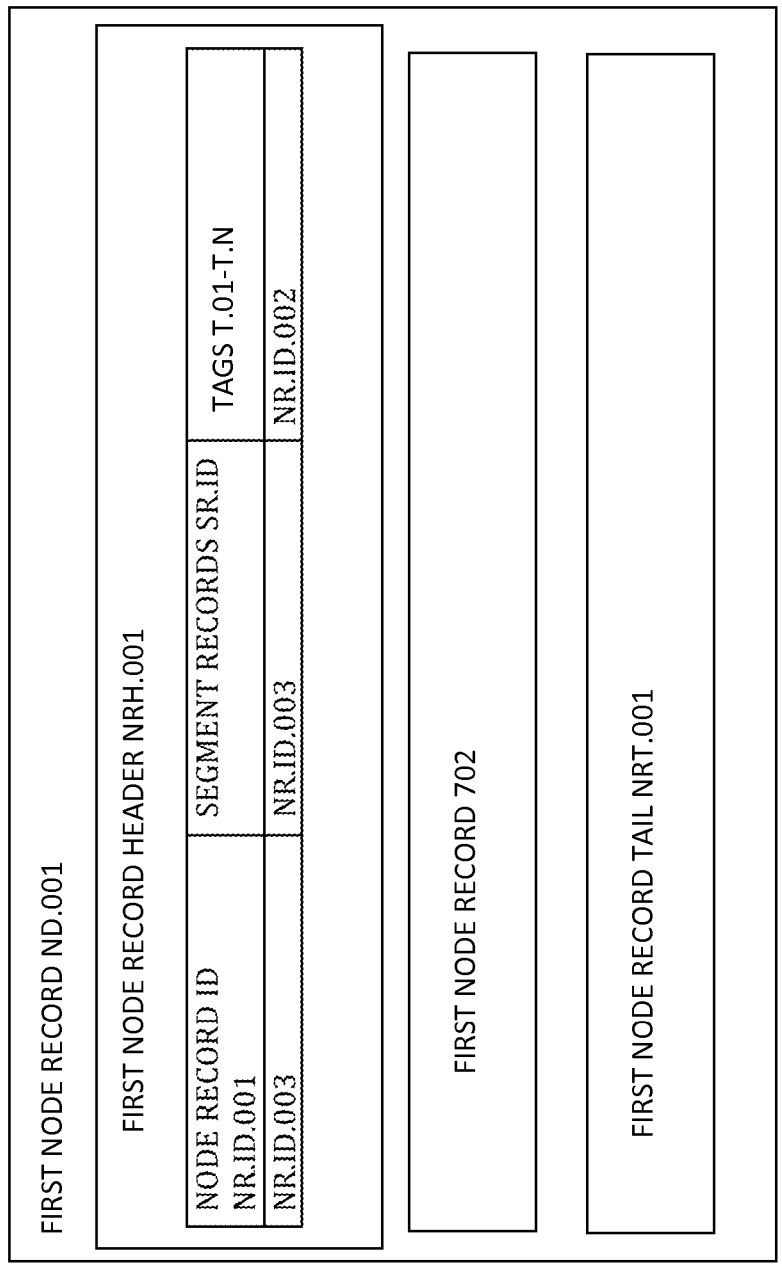
FIG. 7 is a schematic diagram of an exemplary first segment record by which a first node FIG. 5 of the invented ebook is defined.
Figure 8A:
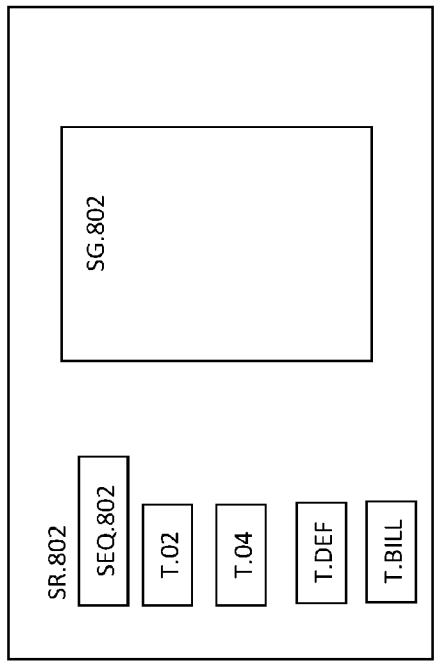
FIG. 8A is a block diagram of a first alternate embodiment of a segment record of FIG. 4 and FIG. 5.
Figure 8B:
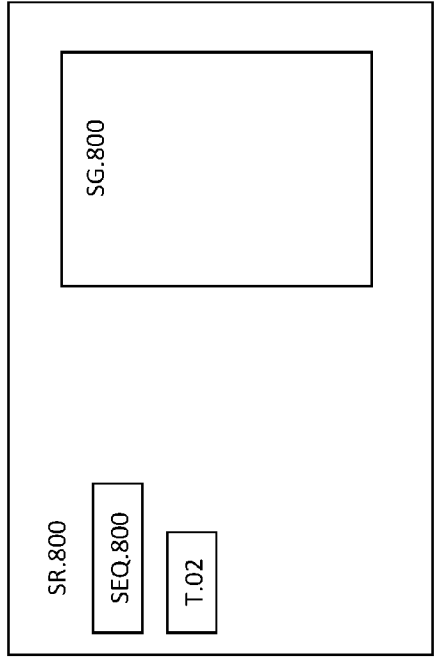
FIG. 8B is a block diagram of a second alternate embodiment of a segment record of FIG. 4 and FIG. 5.
Figure 8C:
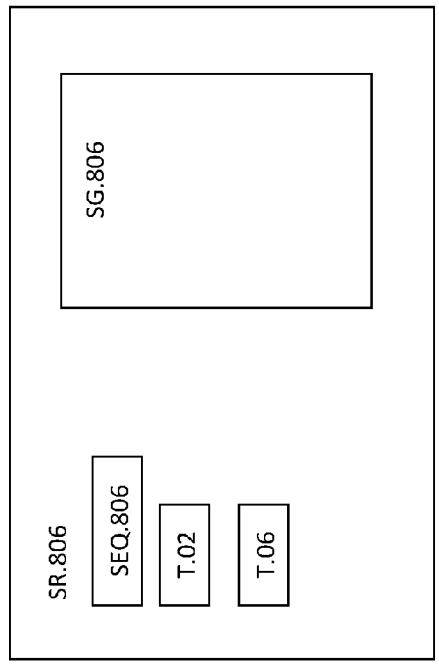
FIG. 8C is a block diagram of a third alternate embodiment of a segment record of FIG. 4 and FIG. 5.
Figure 8D:
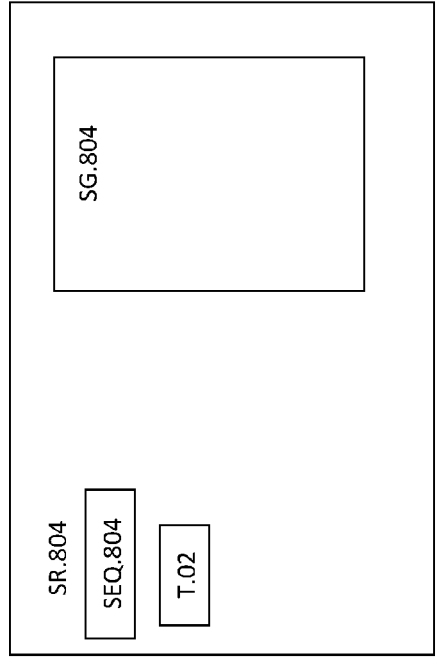
FIG. 8D is a block diagram of a fourth alternate embodiment of a segment record of FIG. 4 and FIG. 5.
Figure 8E:
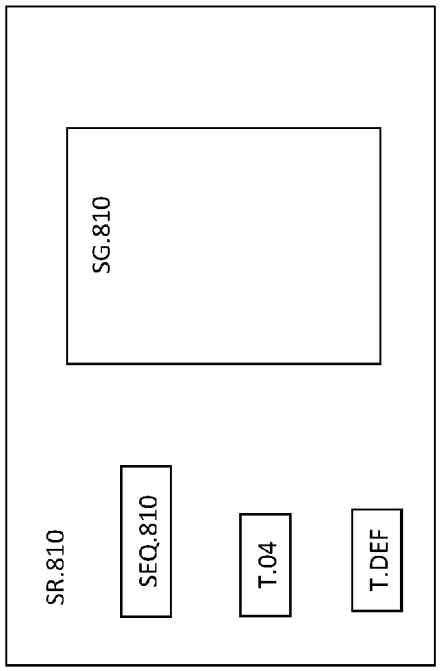
FIG. 8E is a block diagram of a fifth alternate embodiment of a segment record of FIG. 4 and FIG. 5.
Figure 8F:
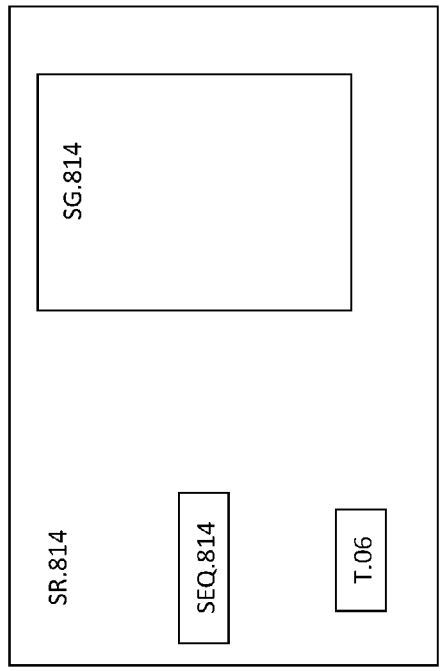
FIG. 8F is a block diagram of a sixth alternate embodiment of a segment record of FIG. 4 and FIG. 5.
Figure 8G:
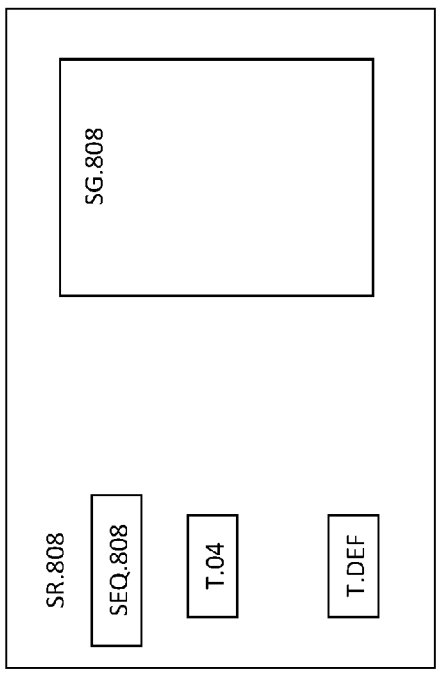
FIG. 8G is a block diagram of a seventh alternate embodiment of a segment record of FIG. 4 and FIG. 5.
Figure 8H:
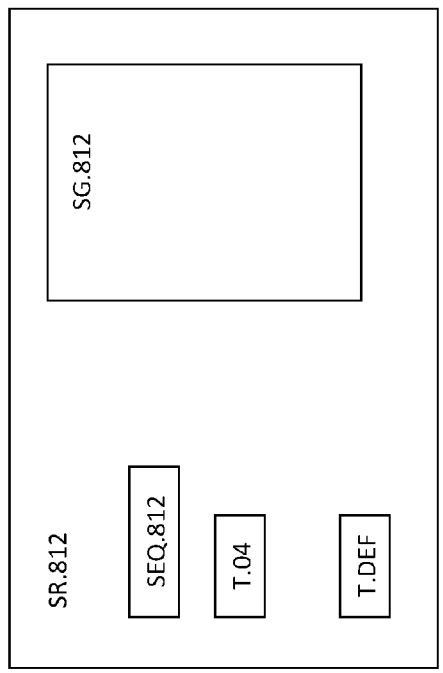
FIG. 8H is a block diagram of an eighth alternate embodiment of a segment record of FIG. 4 and FIG. 5.
Figure 8J:
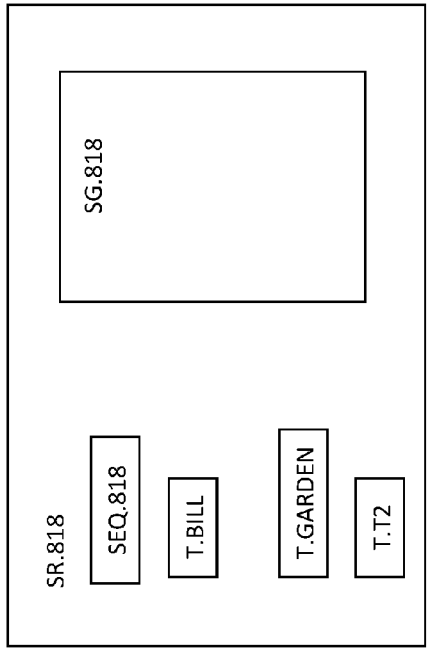
FIG. 8J is a block diagram of a tenth alternate embodiment of a segment record of FIG. 4 and FIG. 5.
Figure 8L:
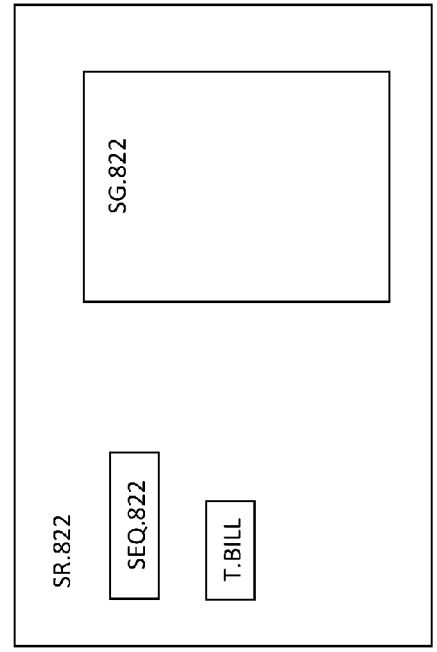
FIG. 8L is a block diagram of a twelfth alternate embodiment of a segment record of FIG. 4 and FIG. 5.
Figure 8I:
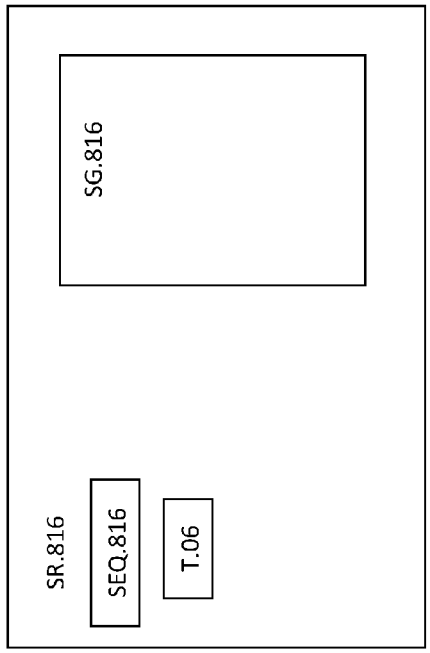
FIG. 8I is a block diagram of a ninth alternate embodiment of a segment record of FIG. 4 and FIG. 5.
Figure 8K:
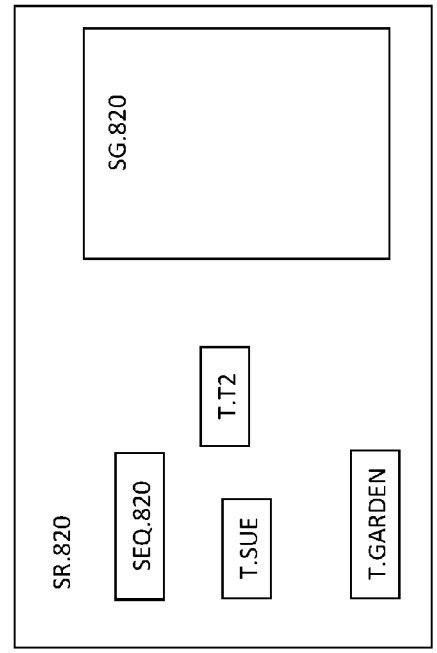
FIG. 8K is a block diagram of an eleventh alternate embodiment of a segment record of FIG. 4 and FIG. 5.

Referring now to FIG. 7, FIG. 7 is an illustration of an exemplary first node record 702 by which the first node ND.001 of FIG. 5 of the invented ebook is defined and that includes a first node record header NRH.001 and a first node record tail NRT.001. The first node record header NRH.001 includes a first node record identifier NR.ID.001, one or more segment record identifiers SR.ID, one or more tags T.01-T.N by the instant reader query of step 3006 of FIG. 3, and one or more node record identifiers NR.ID. The one or more tags T.01-T.N may alternatively provided as a default set of tags T.01-T.N by the ebook reader software SW.1.

Referring now generally to the Figures and particularly to FIGS. 8A through 8L, FIGS. 8A through 8L each present aspects of individual segment records SEG.800-SEG.822 that each contain unique (a.) sequence numbers SEQ.800-SEQ.822 (b.) segments of the source text SG.800-SG.822; and (c.) combinations of tags, a single sequence number, and a segments. A plurality of three segment records SR.800, SR.802, SR.804 and SR.806 each include a same plot line moment tag T.02 that indicates that each of the four segments SEG.800, SEG.802, SEG.804 and SEG.806 separately comprised within these four segment records SR.800, SR.802, 804 & SR.806 are tagged by the editor as occurring contemporaneously within a plot timeline. Segment records SR.800, SR.802, SR.804 and SR.806 thereby form, or are comprised within, a first plot line moment thread TH.02 as indicated in FIG. 9.

The four segment records SR.802, SR.808, SR.810 & SR.812 each comprise a first character tag T.04 that indicates that the four individual segments SEG.802, SEG.808, SEG.810 & SEG.812 separately comprised within each of these four segment records SR.802, SR.808, SR.810 & SR.812 are each associated with a same first character. These four segment records SR.802, SR.808, SR.810 & SR.812 thereby define, or may be comprised within, a first character thread TH.04 as indicated in FIG. 9.

Similarly, three narrative voice segment records SR.806, SR.814 & SR.816 each comprise a first narrative voice tag T.06 that indicates that each of the three individual segments SEG.806, SEG.814 & SEG.816 separately comprised within these three segment records SR.806, SR.814 & SR.816 are each associated with a same first narrative voice. The three narrative voice segment records SR.806, SR.814 & SR.816 thereby define, or may be comprised within, a first narrative voice thread TH.06 as indicated in FIG. 9.

Figure 9:
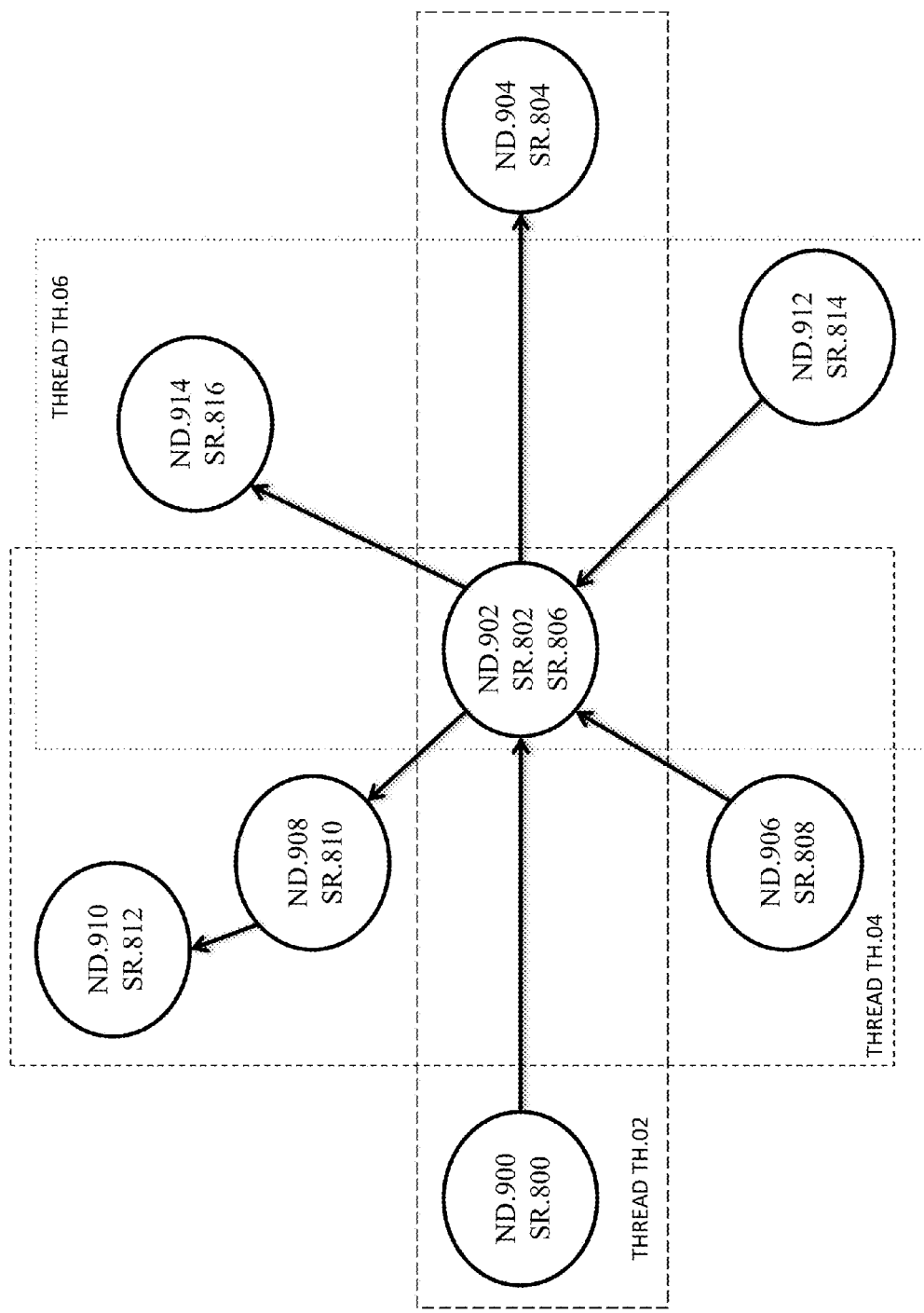
FIG. 9 is an exemplary node diagram, wherein each nodes references at least one segment record of FIG. 8.

Referring now to FIG. 9, FIG. 9 is a representation of a plurality of nodes ND.900-914 that are generated by the ebook reader 4 prior to, or at runtime, of the ebook 2 and that reference the segment records SEG.800-SEG.816 of FIG. 8. Nodes ND.900, ND.902 and N904 each reference at least one segment record SR.800, SR.802, SR.804 and SR.806 of the first plot line moment thread TH.02, wherein each of these four segment records SR.800, SR.802, SR.804 and SR.806 separately each include the plot line moment tag T.02. It is noted that the second node ND.902 references the two segment records SR.802 and SR.806.

Four nodes ND.902, ND.906, ND.908 and ND.910 each reference an individual segment record SR.802, SR.808, SR.810 and SR.812 that are comprised within the first character thread TH.04 and indicated by an inclusion of the first character tag T.04 in each of the first character thread segment records SR.802, SR.808, SR.810 & SR.812.

Three nodes ND.902, ND.912, and ND.914 each reference an individual segment record SR.802, SR.806, SR.814 and SR.816 that are comprised within the first narrative voice thread TH.06 and indicated by an inclusion of the first narrative voice tag T.06 in each of the first character thread segment records SR.806, SR.812 & SR.816.

It is understood that in various preferred embodiments of the method of the present invention that one or more nodes ND.001-ND.N may include more than a reference to a segment records SR.001-SR.N, and may comprise some or all of the structure and information of one or more segment records SR.001-SR.N.

Figure 10:
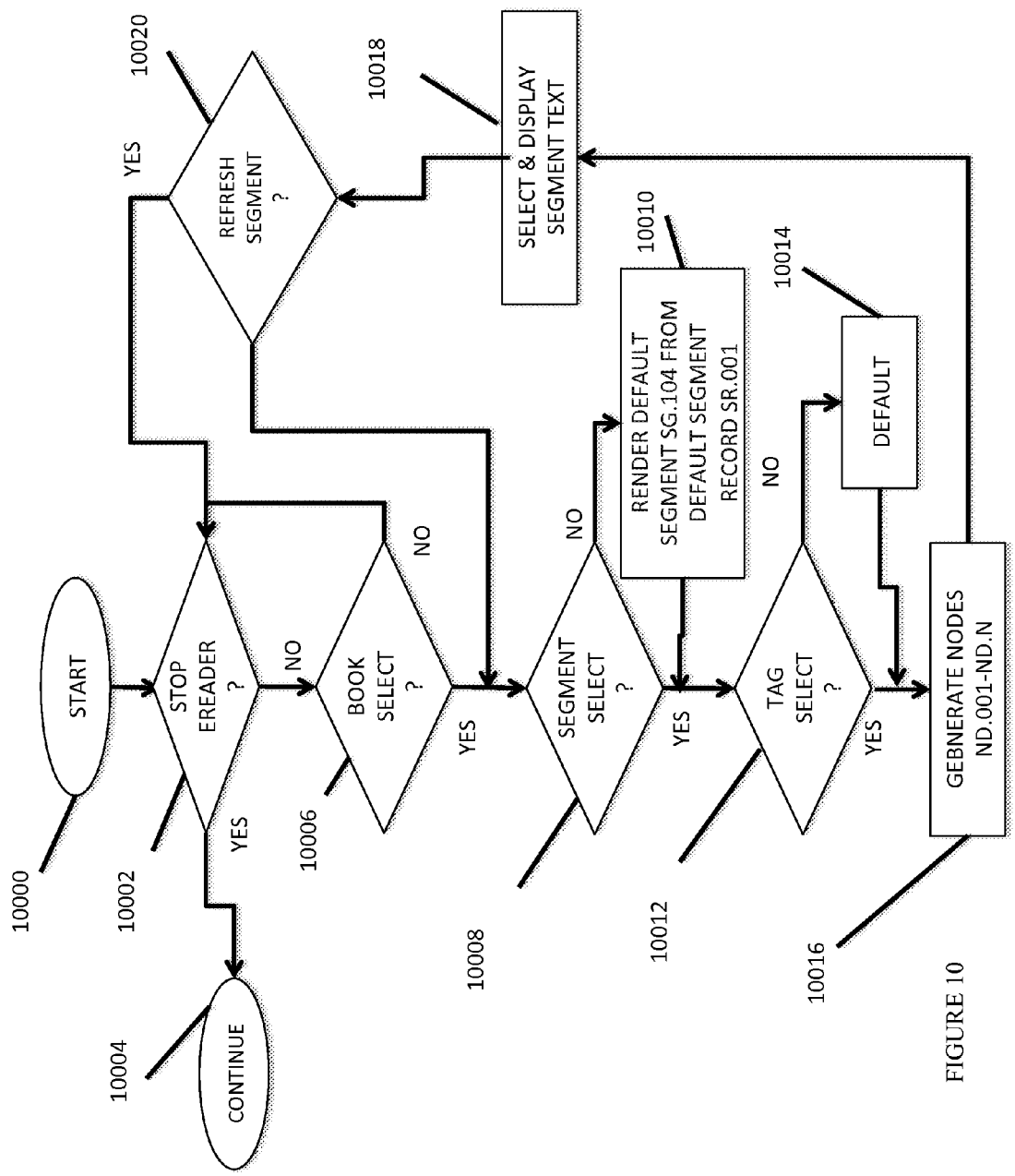
FIG. 10 is a flow chart of an ebook reader in providing a user-interactive process that enables a human reader to access the invented ebook of FIG. 2.

FIG. 10 is a flow chart of the ebook reader 4 in providing a user-interactive process that enables the reader to access the invented ebook 2 in selectable pathways of nodes through the ebook 2. The plurality of nodes ND.001-ND.N are generated by reader interaction in step 3006 of FIG. 3, which may include the reader inputting or selecting an aspect of the ebook 2 that is associated with a tag T.001-T.N, or alternatively, by a default selection by the ebook reader software SW.1 of a default tag T.DEF.

For example, where the editor wishes to associate a particular and unique third character tag T.BILL with a fictional character BILL mentioned in the invented ebook, the third character tag T.BILL will be entered by the editing system 200 as directed by the editor into selected segment records SG.001-SG.N. When the reader requests to sequentially access each segment record SG.001-SG.N that is associated with the third character tag T.BILL, the reader will input into the ebook reader 4, by icon selection or textual input, an interest in the character BILL, and the reader software will thereupon generate and associate a node ND.001-ND.N for each segment record SG.001-SG.N that contains the third character tag T.BILL.

The ebook reader 4 may further optionally associate additional segment records SG.001-SG.N with one or more nodes ND.001-ND.N when an additional record SG.001-SG.N lacks a reference to the third character tag T.BILL but includes a degree of commonality with the immediately associated segment record SG.001-SG.N. For example, when the segment record SR.818 includes both (a.) a second plot line moment tag T.T2 and (b.) a place tag T.GARDEN that relates to a notional garden setting, and the segment record 820 includes both the second plot line tag T.T2 and the place tag T.GARDEN but also includes a reference to a fourth character tag T.SUE that relates to a fourth character SUE, the second node ND.002 may be generated by the editing software include a reference to the segment record SR.820 based on the commonality of the sharing the place tag T.GARDEN and the second plot line moment tag T.T2. The ebook reader software SW.1 will thereby be enabled to expeditiously respond to requests by the reader to access segments SG.001-SG.N that are tangentially related to the previously selected third character T.BILL but do not include the third character T.BILL that is optionally the rationale for the a generation of the plurality of nodes ND.001-ND.N.

Referring now generally to the Figures and particularly to FIG. 10, the ebook reader 4 is energized and boots up in step 1000, and in step 10002 determines whether to cease processing the ebook reader software SW.1 and proceed on to alternate computational operations of step 10004. When the ebook reader 4 determines to not proceed on to step 10004 from step 10002, the ebook reader 4 proceeds on to step 10006 and to determine if an ebook 2 selection command has been received from the user. When a selection command is detected by the ebook reader 4 in step 10006, the ebook reader 4 proceeds on from step 10006 to a first execution of step 10008 and to select a default first segment record SR.001 in step 10010 from which to render the default segment SG.104 unless the user inputs a segment select command that indicates selection of an identified alternate segment SG.106-SG.N or segment record SR.001-SR.N. The ebook reader 4 thereupon determines in step 10012 whether to follow a default tag T.DEF of step 10014 or to follow a tag T.001-T.N provided or selected by the user in a tag selection command. The ebook reader then either generates the plurality of nodes N.001-ND.N that each reference or include at least one segment record SR.001-SR.N, and proceeds to render a segment from SG.001-SG.N in step 10018 selected from the first node ND.001-ND.N, by reference or inclusion in the instant node ND.001-ND.N. The ebook reader 4 then determines in step 10020 whether to continue sequentially rendering segments SG.001-SG.N by successive executions of the loop of steps 10008 through 10020, or to proceed repeat an execution of step 10002. The ebook reader software SW.1 provides the machine executable instructions required by the ebook reader 4, as directed by user commands, to execute steps 10002 through 10020.

Figure 11:
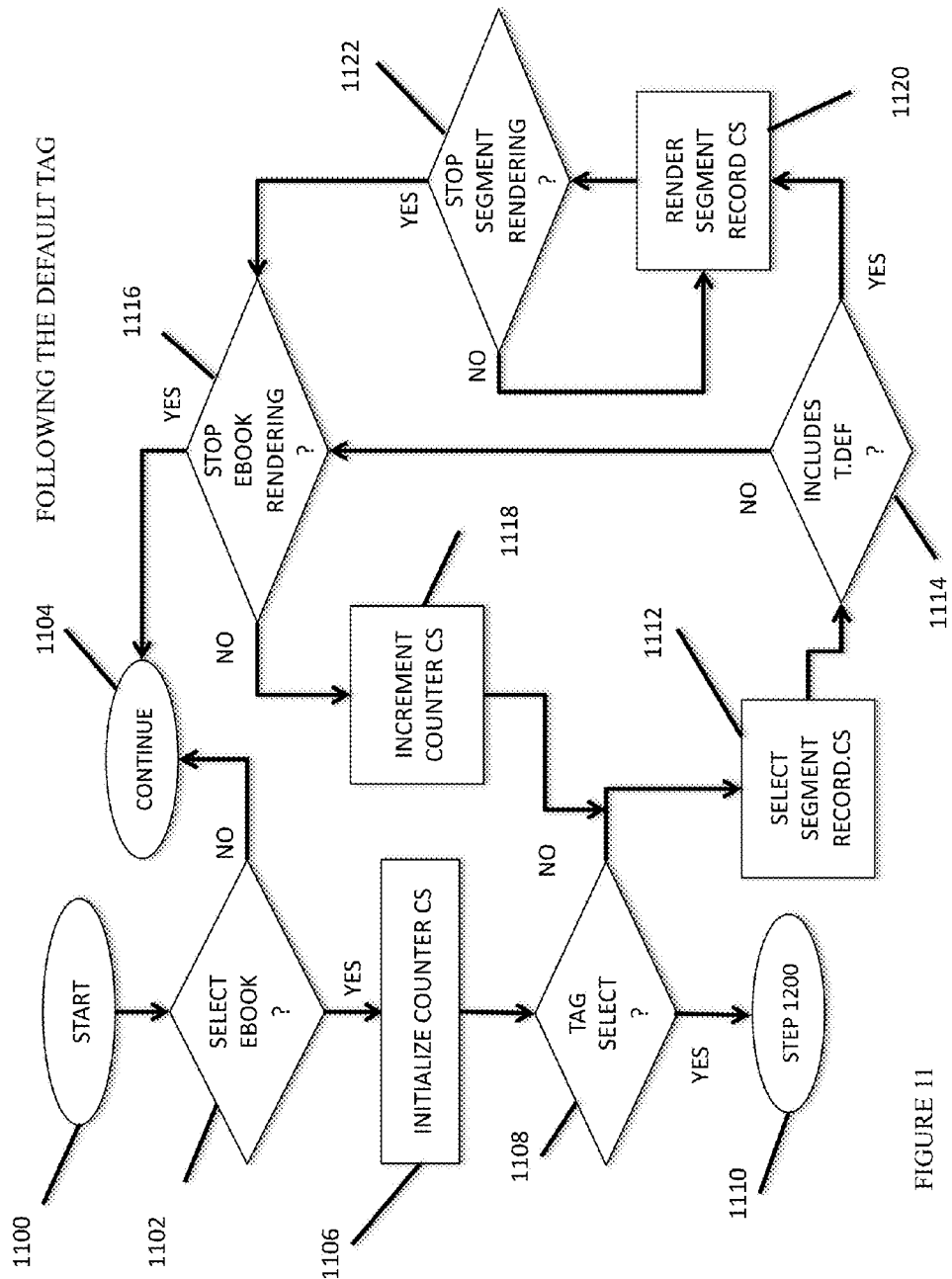
FIG. 11 is a flowchart an invented method of applying a default tag for execution by the ebook reader in interaction with the reader.

Referring now generally to the Figures and particularly to FIG. 11, FIG. 11 is a flowchart of a second preferred embodiment of aspects of the invented method of applying a default tag T.DEF for execution by the ebook reader 4 in interaction with the reader. The ebook reader 4 determines whether the reader has selected an ebook 2 for rendering in step 1102, and moves on to alternate computational operations of step 1104 when the ebook reader 4 does not detect a user command to select an ebook 2 in step 1102. When the ebook reader 4 in step 1102 detects a user command to select and render an ebook 2, the ebook reader 4 proceeds on to step 1106 and initializes a segment counter CS, and determines in step 1108 whether a tag T.001-T.N has been selected or inputted by the user. When the ebook reader 4 determines in step 1108 that the user has input or selected a tag T.001-T.N, the ebook reader 4 proceeds form step 1108 to step 1110 and to perform the process of FIG. 12 in step 1200.

Alternatively, when the ebook reader 4 determines in step 1108 that the user has not input or selected a tag T.001-T.N, the ebook reader 4 proceeds from step 1108 to step 1112 and to proceed to sequentially render the segment records SR.001-SR.N that reference the default tag T.DEF. The ebook reader 4 proceeds from step 1112 to execute the logic of steps 1112 through 1122 until the ebook reader 4 determines in an execution of step 1116 that the segment counter CS has been incremented by successive increments to become equal to a maximum count N of segment records SR.001-SR.N, or the user directs the ebook reader 4 to cease rendering the selected ebook 2. More particularly, the ebook reader 4 sequentially examines each segment record SR.001-SR.N to determine if each segment record SR.001-SR.N references or includes the default tag T.DEF, and sequentially renders each segment record SR.001-SR.N that references or includes the default tag T.DEF in step 1120. The user prompts the ebook reader 4 to proceed on to a next segment record in step 1122.

Figure 12:
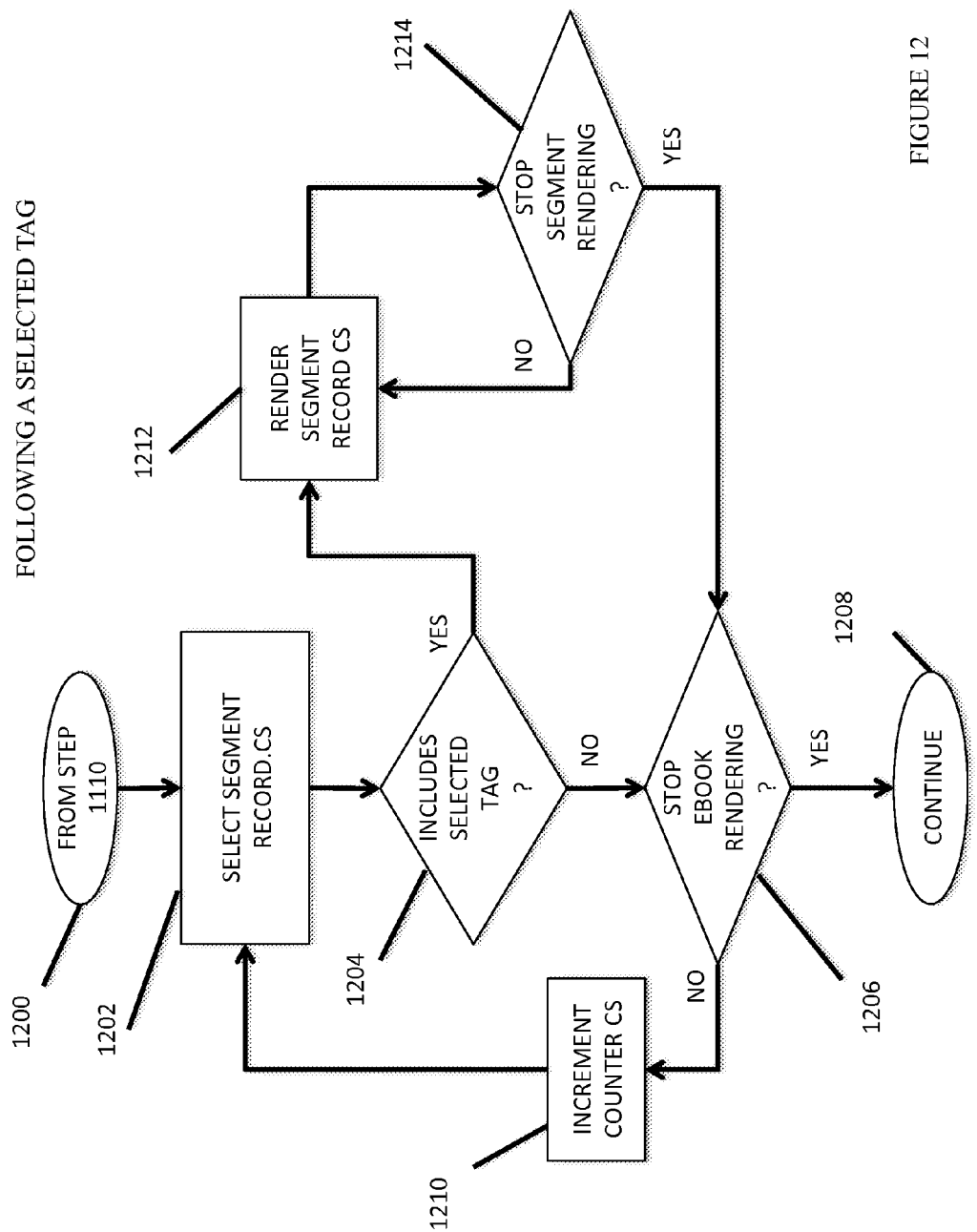
FIG. 12 is a flowchart of an invented method of applying a user selected tag as executable by the ebook reader in interaction with the reader.

Referring now generally to the Figures and particularly to FIG. 12, FIG. 12 is a flowchart of a third preferred embodiment of aspects of the invented method applying a user selected tag T.001-T.N as executable by the ebook reader 4 in interaction with the reader. In steps 1200 through 1214 the ebook reader 4 sequentially selects each segment record SR.001-SR.N step 1202 and sequentially renders each segment record SR.001-SR.N in step 1212 that references or includes the user selected tag T.001-T.N detected in step 1108. The user prompts the ebook reader 4 to proceed onto a succeeding segment record SR.001-SR.N in step 1214. The ebook reader 4 will continue incrementing the segment counter CS in repeated execution of steps 1202 through 1214 until either (a.) the segment counter becomes equal to or exceeds a maximum segment count N; or (b.) the user enters a command to stop rendering segments SG.001-SG.N in either step 1206 or step 1214. From a negative determination in step 1206 the ebook reader 4 increments a counter CS and proceeds to step 1202. Alternatively, from a positive determination in step 1206, the ebook reader 4 continues to alternate processes in step 1208.

Figure 13:
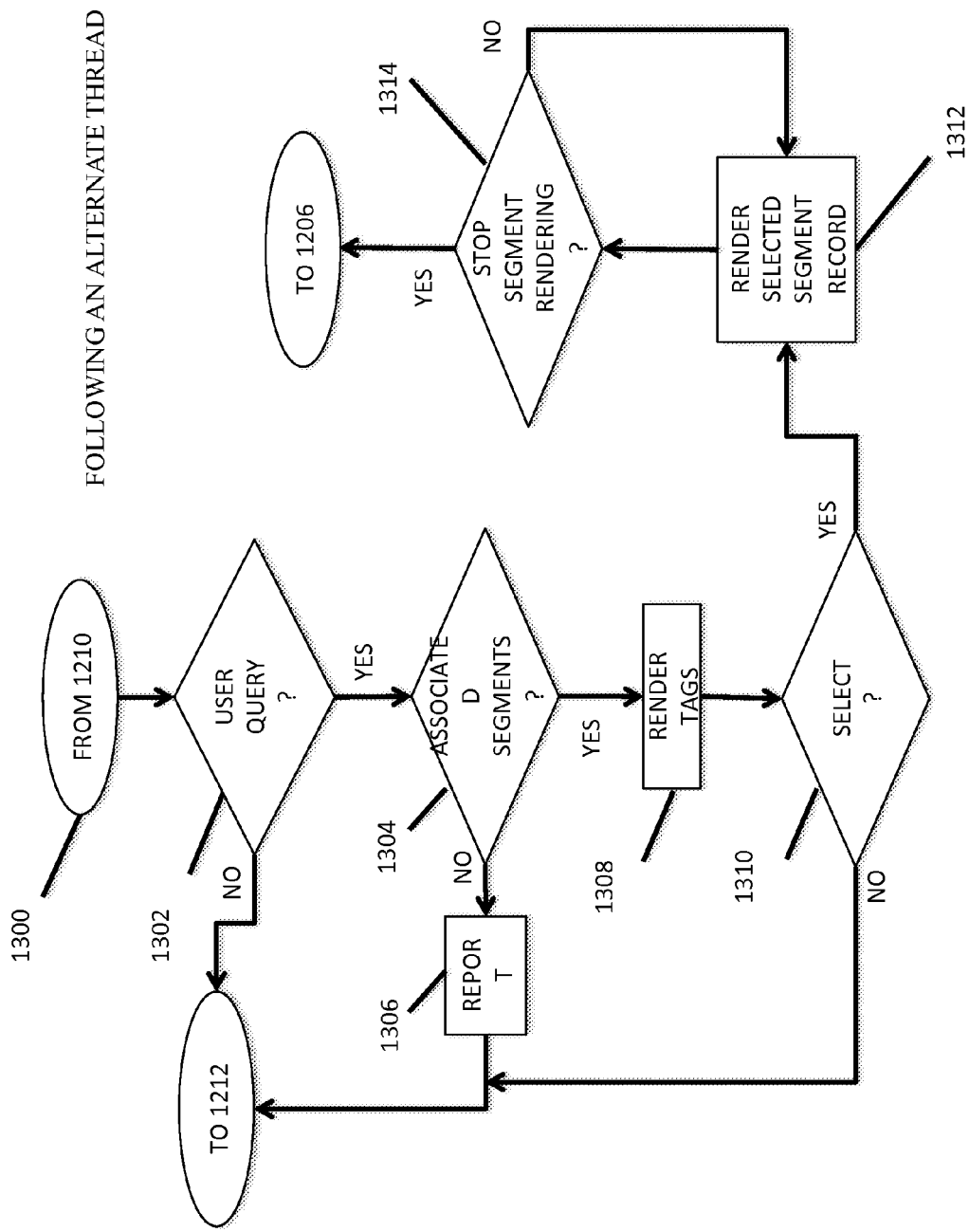
FIG. 13 is a flowchart of a additional aspects of the invented method of applying a user selected tag for execution by the ebook reader in interaction with the reader.

Referring now generally to the Figures and particularly to FIG. 13, FIG. 13 is a flowchart of a third preferred embodiment of aspects of the invented method applying a user selected tag T.001-T.N as executable by the ebook reader 4 in interaction with the reader, whereby the reader directs the ebook reader 4 to select segments SG.001-SG.N associated with an alternate tag T.001-T.N for rendering after the reader previously having selected a first tag T.001-T.N in a previous execution of step 1108. During a rendering in step 1212 of a segment SG.001-SG.N, the user queries whether any other segment records SR.001-SR.N are associated with a same node ND.001-ND.N as the segment record SR.002-SR.N selected in the most recent execution of step 1212, which query comprises step 1302 of FIG. 13. When it is determined in step 1302 that the user has not queried the ebook reader 4, the ebook reader 4 proceeds to step 1212 of FIG. 12. When it is determined that the user has queried the ebook reader 4, the ebook reader 4 proceeds to step 1304. If no additional associated segment records SR.001-SR.N are determined in step 1304, the ebook reader 4 proceeds on to step 1306 and reports to the user a rendered message to that effect. In step If at least one additional associated segment record SR.001-SR.N is determined in step 1304, the ebook reader 4 proceeds on to step 1308 and render a message indicating the additional tag(s) T.001-T.N in step 1308.

The ebook reader 4 determines in step 1310 whether the reader has selected a different tag T.001-T.N than applied in the most recent execution of step 1212. When the ebook reader 4 determines in step 1310 that the reader has selected a new tag T.001-T.N, the ebook reader 4 renders the segment SG.001-SG.N of the segment record SR.001-SR.N comprising the tag T.001-T.N selected in step 1310. As directed by the reader, the ebook reader 4 ceases rendering the segment SG.001-SG.N of step 1312, and then proceeds from step 1314 to step 1206, and thereafter selects segments SG.001-SG.N for rendering that include the newly selected tag of step 1310 in further implementations of steps 1202 through 1214.

Figure 14:
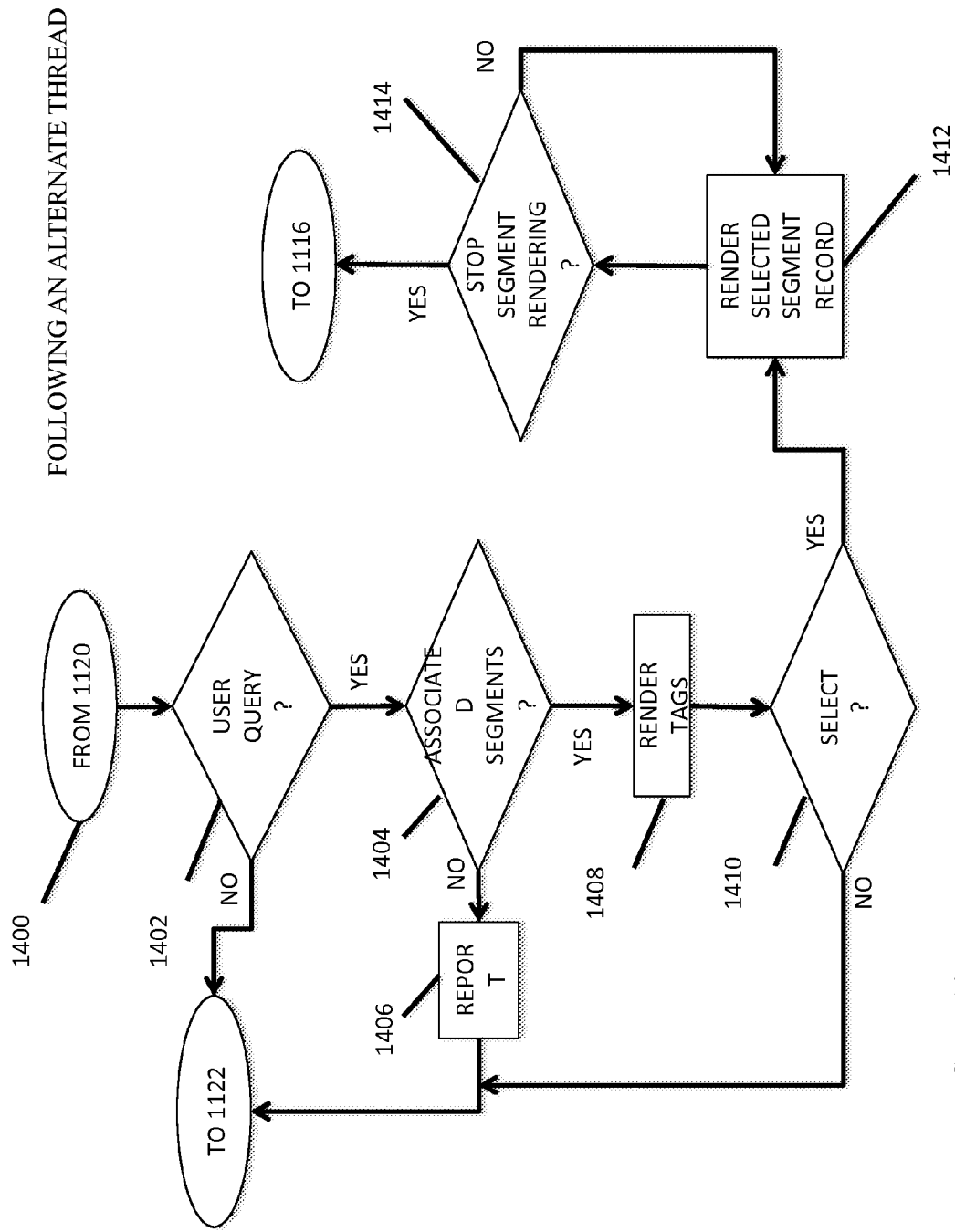
FIG. 14 is a flowchart of a fourth aspect of the invented method of applying a user selected tag as executable by the ebook reader in interaction with the reader.

Referring now generally to the Figures and particularly to FIG. 14, FIG. 14 is a flowchart of a fourth preferred embodiment of aspects of the invented method applying a user selected tag T.001-T.N as executable by the ebook reader 4 in interaction with the reader, whereby the reader directs the ebook reader 4 to follow an alternate tag T.001-T.N after initially selecting out segment records SR.001-SR.N that include or reference the default tag T.DEF.

During a rendering in step 1120 of FIG. 11 of a segment SG.001-SG.N, the user queries whether any other segment records SR.001-SR.N are associated with a same node ND.001-ND.N as the segment record SR.002-SR.N selected in the most recent execution of step 1120 of FIG. 1, which query comprises step 1402 of FIG. 14. When it is determined in step 1402 that the user has not queried the ebook reader 4, the ebook reader 4 proceeds to step 1122 of FIG. 11. When it is determined that the user has queried the ebook reader 4, the ebook reader 4 proceeds to step 1404. If no additional associated segment records SR.001-SR.N are determined in step 1404, the ebook reader 4 proceeds on to step 1406 and reports to the user a rendered message to that effect. If at least one additional associated segment record SR.001-SR.N is determined in step 1404, the ebook reader 4 proceeds on to step 1408 and render a message indicating the additional tag(s) T.001-T.N in step 1408.

The ebook reader 4 determines in step 1410 whether the reader has selected a different tag T.001-T.N than applied in the most recent execution of step 1120. When the ebook reader 4 determines in step 1410 that the reader has selected a new tag T.001-T.N, the ebook reader 4 renders the segment SG.001-SG.N of the segment record SR.001-SR.N comprising the tag T.001-T.N selected in step 1410. As directed by the reader, the ebook reader 4 ceases rendering the segment SG.001-SG.N of step 1412, and then proceeds from step 1414 to step 1116, and thereafter selects segments SG.001-SG.N for rendering that include the newly selected tag of step 1410 in further implementations of steps 1112 through 1122.

Figure 15:
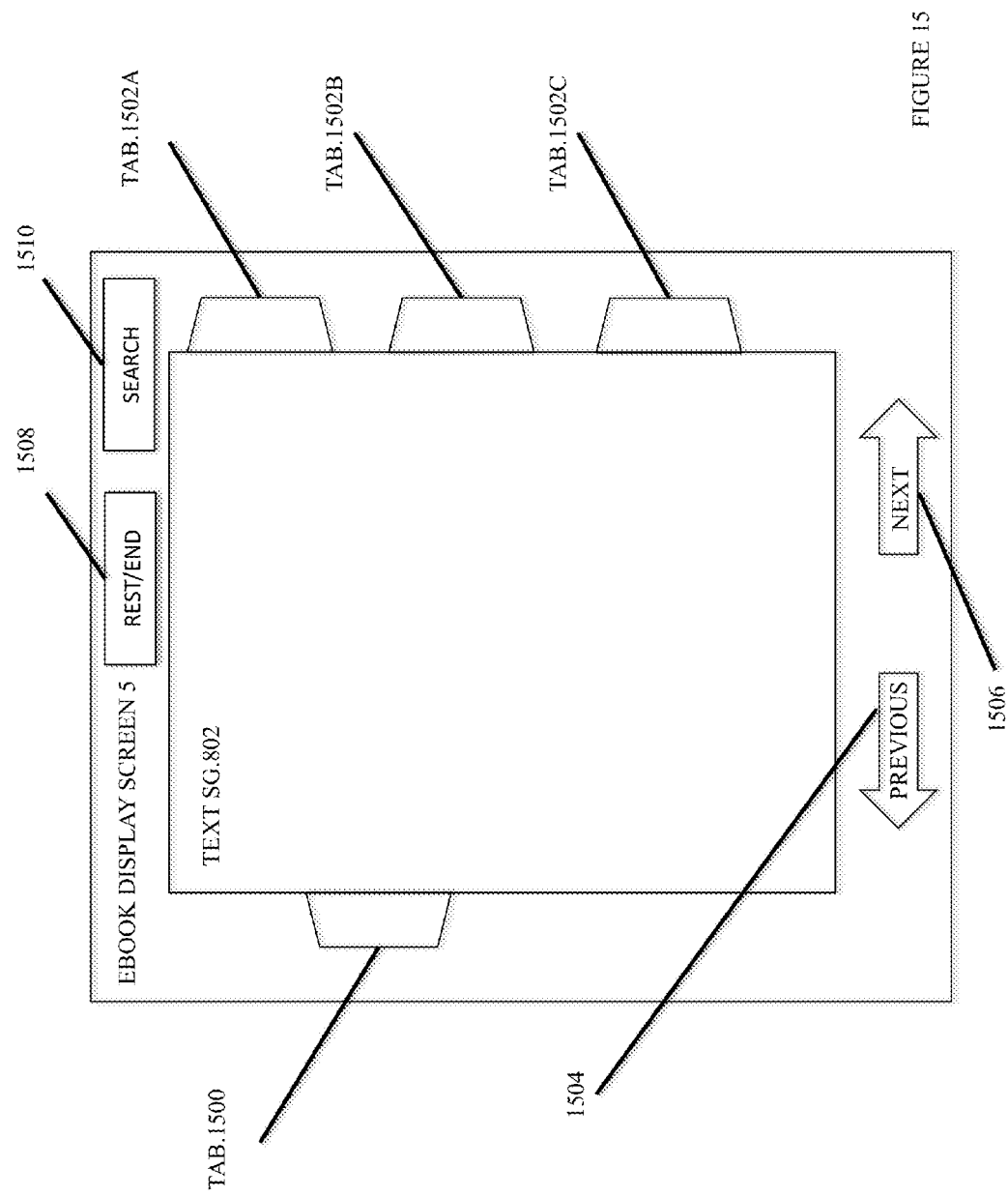
FIG. 15 is an illustration of an ebook reader user interface.

Referring now generally to the Figures and particularly to FIG. 15, FIG. 15 is an illustration of a user interface 1500 of the ebook reader 4 as rendered on the ebook reader display screen 5 under as directed by user interaction and the ebook reader system software SW.1. In this exemplary illustration, a selected text segment SG.802 that is stored within or associated with the exemplary segment record SR.802 is rendered. The current tag T.04, as previously selected by the reader, and that the ebook reader software SW.1 is therefore currently following, is indicated by a first tab label TAB.1500. Additional tags T.02 & T.BILL comprised within or referenced by the exemplary segment record SR.802 are presented respectively by two additional tab labels TAB.1502A and TAB.1502B. In further addition, a fourth tag T.06 of an alternate segment record SR.806 that is associated with a same node ND.902 as is the currently rendered segment SG.802 is indicated by a fourth tab label TAB.1502C.

The user interface 1500 further includes three command buttons 1504, 1506 & 1508 and a search string input and activation box 1510. The reader may direct the ebook reader 4 to proceed to render a next segment SG.810 in sequentially following the second tag T.04 by activating the NEXT command button 1506. Alternatively, the reader may direct the ebook reader 4 to proceed to render a previous segment SG.808 in following the second tag T.04 in reverse sequence by activating the PREVIOUS command button 1504. Additionally, the reader may direct the ebook reader 4 to cease to render segments SG.001-SG.N by selecting the REST/END command button 1508. Yet alternatively, the ebook reader 4 may enter a textual search string in the string input and activation box 1510 and then activate this box 1510 to direct the ebook reader software SW.1 to find and report instances of the entered string in the ebook 2.

The reader may further direct the ebook reader 4 to render an alternate segment SG.806 by selecting a nodal tab, e.g. fourth tab label TAB.1502C that represents an alternative segment SG.806 that is associated by a node ND.902 with the currently rendered segment SG.802. When an alternate segment record SR.001-SR.N is selected by the reader, the newly selected segment SG.001-SG.N of that selected record SR.001-SR.N is then rendered in the ebook display screen 5 and the current tab label TAB.1500 is revised to reference the newly accessed segment record SR.001-SR.N. For example, should the reader select the third tab label TAB.1502C when rendering the exemplary segment SG.802, the ebook reader SW.1 would react by rendering the alternate text SG.806 of segment record SR.806 and alter the first tab label TAB.1500 to reference both the alternate tag T.06 and the segment record SR.806 that comprises the newly rendered segment SG.806. The additional tab labels TAB.1502A-1502C are also then updated to reference the tab associations of the newly selected segment record SR.806. The command buttons of NEXT 1506 and PREVIOUS 1504 would then track the tag T.06 newly referenced by the first TAB.1500.

Figure 16:
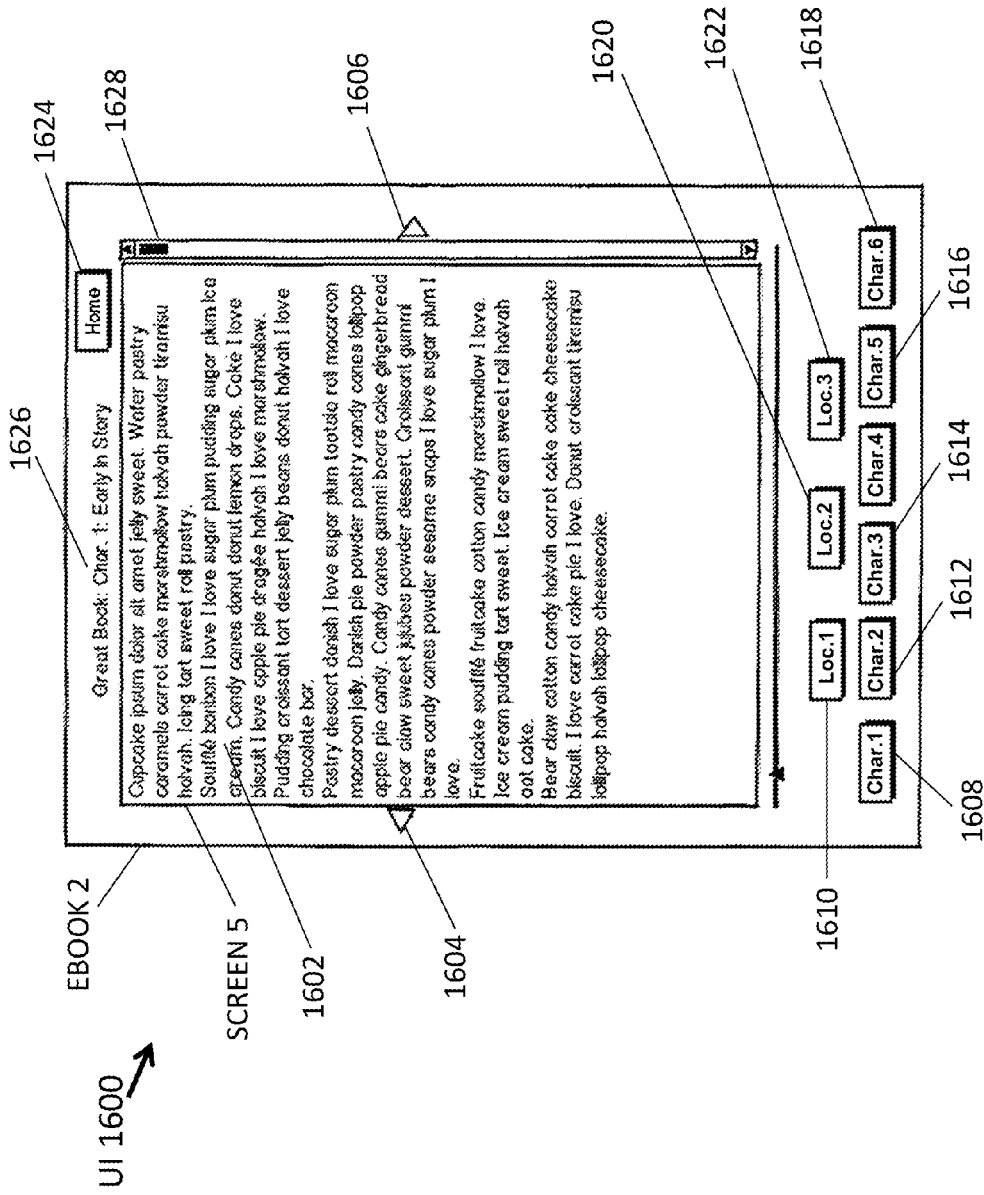
FIG. 16 is an illustration of a second ebook reader interface.

Referring now generally to the Figures and particularly to FIG. 16, FIG. 16 is an illustration of a second user interface 1600 (or "UI" 1600) of the ebook reader 4 as rendered on the ebook reader display screen 5 and generated by the ebook reader system software SW.1 in interaction of the ebook reader 4 with the user. In this exemplary illustration of FIG. 16, a selected text 1602 of an exemplary segment SG.810 that is stored within or associated with the exemplary subsequent segment record SR.810 is rendered in the ebook display screen 5. A previous button 1604 and a next button 1606 are visually rendered in the display screen 5 and enable the user to respectively select the previous segment record SR.802 or the next segment record SR.812 of the first thread TH.04 for deriving a next or following rendering of text 1602 in the display screen 5. Label buttons 1610-1622 enable the user to make choices to select alternate tags T.01-T.N and thereby follow alternate threads TH.1-TH.3 and TH.5-TH.N or to continue to follow a selected thread TH.1-TH.N and render text 1602 and images selected from or associated with segment records SR.001-SR.N. A visually rendered home button 1624 enables the user to direct the ebook reader 4 to return to displaying a home page. An informational text 1626 informs the user about the current ebook 2 being rendered and may provide information concerning the currently rendered text 1602 in relation to the entire ebook 2. A visually rendered scroll control 1628 allows the user to direct the ebook reader 4 to render text 1602 from a single segment record SR.001-SR.N or of a currently selected thread TH.1-TH.N.

The label buttons 1608-1622 may optionally or additionally (a.) be visually shaded or affected to indicate which tag T.01-T.N is being currently followed, e.g., character label CHAR.1 1608 and location label LOC.1 1610; (b.) about other tags T.01-T.N with which the currently rendered text 1602 is associated, e.g. second character label CHAR.2 1612 and third location label LOC.3 1622; and/or additional labels 1614-1620 that are available within the ebook 2 and associated with different tags.

Figure 17:
FIG. 17 is a representation of a software table that associates tags of FIG. 5 with labels of FIG. 15 and FIG. 16 in one-to-one relationships.

Referring now generally to the Figures and particularly to FIG. 17, FIG. 17 is an illustration of a tag to label table 1700 that separately associates (a.) rendered labels 1610-1622 and tabs 1500, 1504, 1506 1502A-1502C with (b.) tags T.01-T.N. Each label/tab to tag pair has a unique identifier PAIRID.1-PAIR.DEF.

It is understood that certain tags are durably associated with individual labels, for example a second location label LOC.2 is durably related to a ninth tag T.09, a sixth character label CHAR.6 is durably related to a fifth tag T.05, and a default label LABEL.DEF with the default tag T.DEFAULT in accordance with the second UI 1600. It is further understood that the ebook system software SW.1 may alternately or additionally alter the associations of tags T.01-T.N with tabs 1500-1508 in accordance with the user interface 1500.

Figure 18:
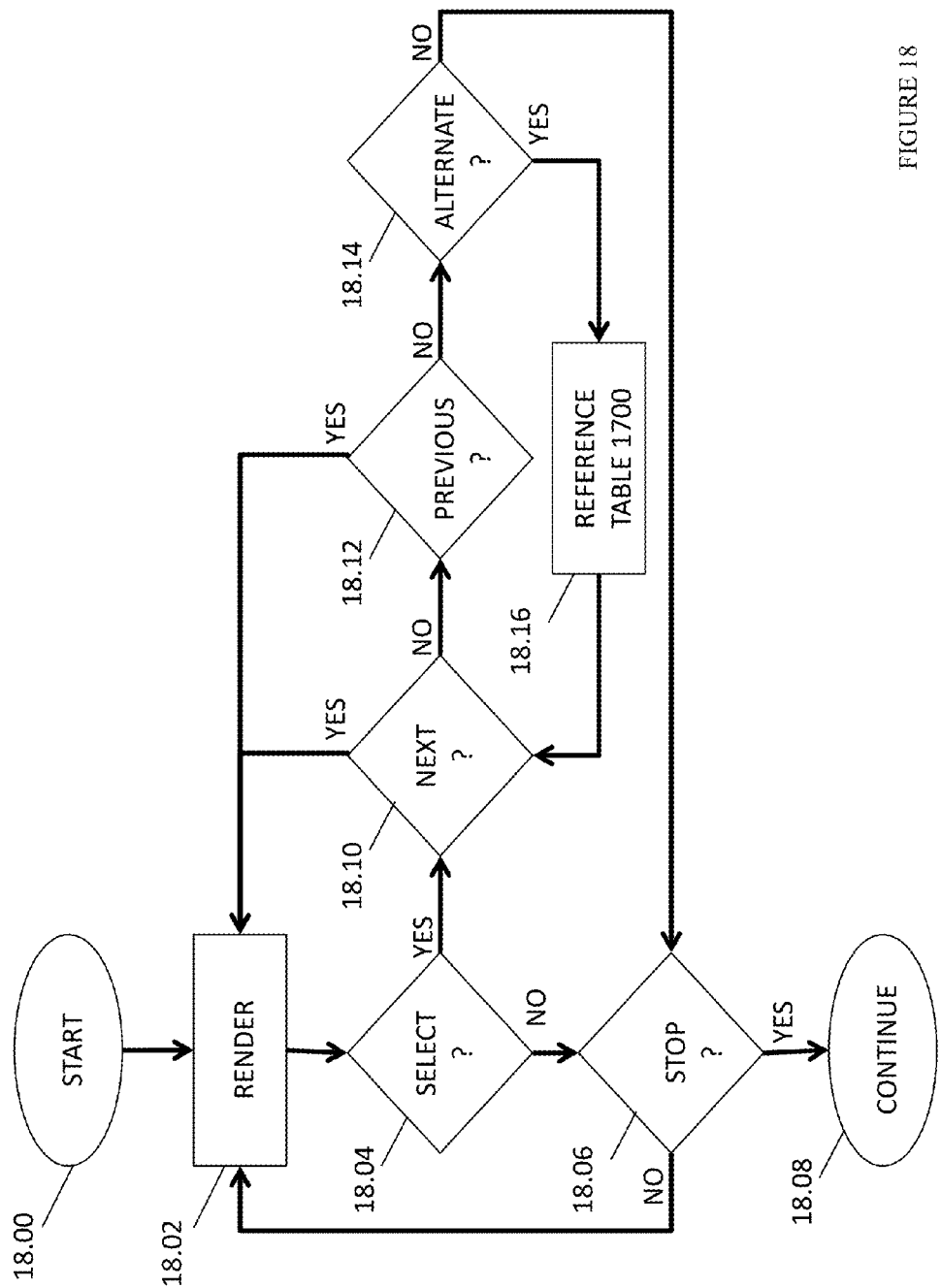
FIG. 18 is a software flowchart of additional optional aspects of the system software of the ebook reader of FIG. 3 and FIG. 20.

Referring now generally to the Figures and particularly to FIG. 18, FIG. 18 is a software flowchart of additional optional aspects of the system software SW.1 of the ebook reader 4. The ebook reader 4 renders text and images 802 in step 18.02 from the most recently selected segment record SR.001-SR.N, for example the second exemplary segment SG.802 of the second exemplary segment record SR.802. In step 18.04 the ebook reader 4 determines whether a label or tab of the as rendered on the display 5 has been selected by the user. When the ebook reader 4 determines in step 18.04 that no tab or label has been selected by the user, the ebook reader 4 proceeds on step 18.06 and to determine whether to continue rendering content from the most recently selected segment record or to proceed on to step 18.08 and to perform alternate computational processes. The ebook reader 4 proceeds from step 18.06 to step 18.08 on the basis of (a.) a time out condition; (b.) a receipt of a detection of a user selection of the REST/END label 1508; or (c.) a receipt of a power down command down from the user.

When the ebook reader 4 proceeds from step 18.06 to step 18.02, the ebook reader 4 continues to render the content from most recently selected segment record SR.001-SR.N. When the ebook reader 4 determines in step 18.04 a tab or label selection by the user has been detected, the ebook reader 4 proceeds on step 18.10 and to determine whether a next segment record SR.001-SR.N of the same thread TH.01-TH.N of the segment record currently being rendered shall be rendered in a following execution of step 18.02. Alternatively, the ebook reader 4 determines in step 18.12 to determine whether a previous segment record SR.001-SR.N of the same thread TH.01-TH.N of the segment record currently being rendered shall be rendered in a following execution of step 18.02. Still alternatively, the ebook reader 4 determines in step 18.14 if the user has indicated that an segment record SR.01-N of an alternate tag T.01-T.N shall be selected for rendering. When the ebook reader 4 determines in step 18.14 that a segment record SR.01-SR.N of a tag T.01-T.N or thread TH.01-TH.N different from the selected tag T.01-T.MN or Thread TH.01_TH.N of the most recently rendered record, the ebook reader 4 references the table 1700 to relate the selected tab 1500, 1502A-1502C or label 1610-1622 to a tag T.01-T.N.

Figure 19:
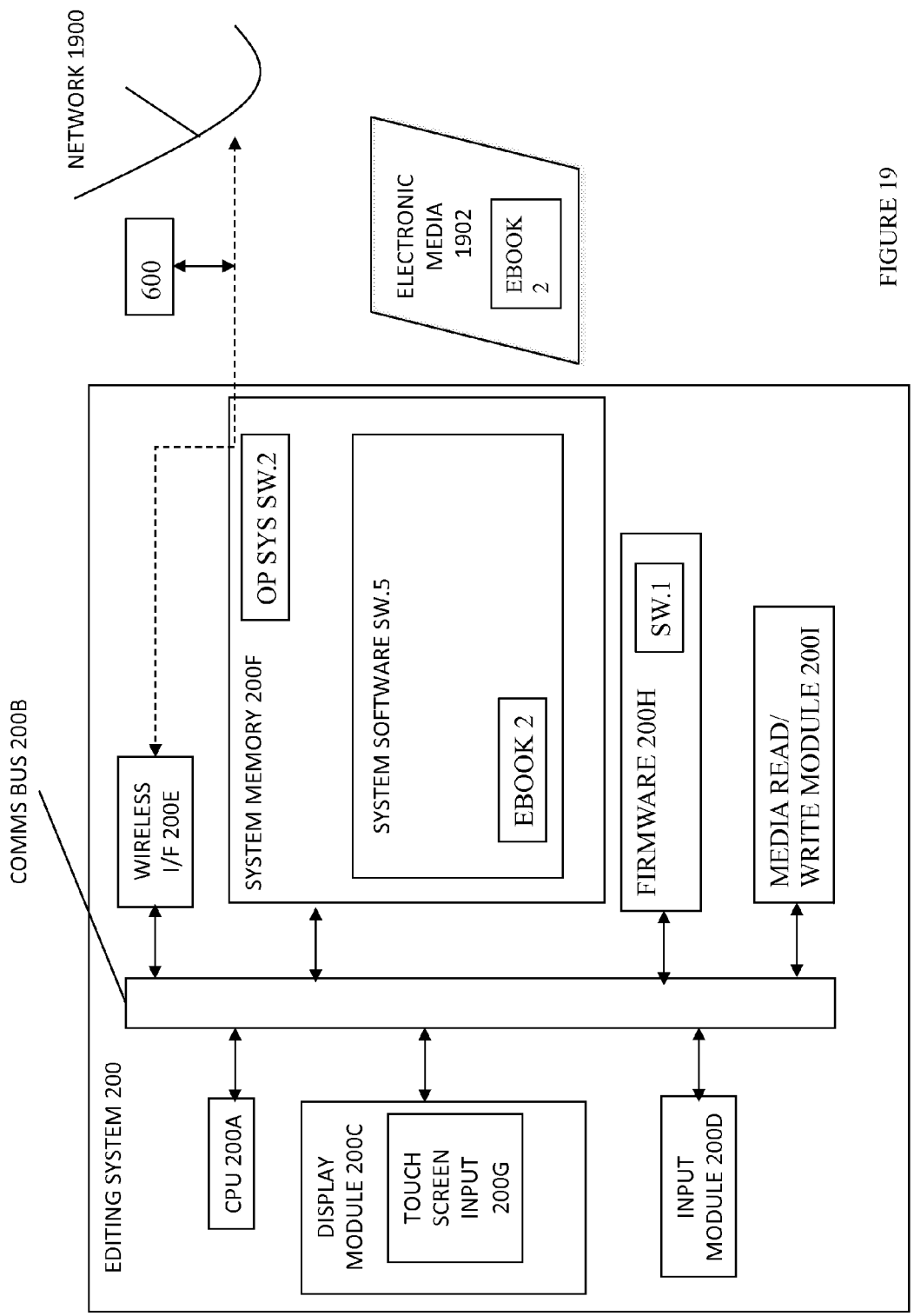
FIG. 19 is a schematic diagram of an ebook editing system of FIG. 1 and publishing system of FIG. 2.

FIG. 19 is a schematic diagram of the ebook editing system 200 and/or ebook publishing system 600. The ebook editing system 200 may be or comprises (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) an IPHONE™ cellular telephone as marketed by Apple, Inc. of Cupertino, Calif.; (g.) an HTC TITAN II™ cellular telephone as marketed by AT&T, Inc. of Dallas, Tex. and running a WINDOWS 7™ operating system as marketed by Microsoft Corporation of Redmond, Wash.; (h.) a GALAXY NEXUS™ smart phone as marketed by Samsung Group of Seoul, Republic of Korea or and running an ANDROID™; (i.) a TOUGHPAD™ tablet computer as marketed by Panasonic Corporation of Kadoma, Osaka, Japan and running an ANDROID™ operating system as marketed by Google, Inc. of Mountain View, Calif.; or (j.) other suitable computational system or electronic communications device known in the art.

The editing system 200A central processing unit is bi-directionally communicatively coupled by a communications bus 200B to a display module 200C, an input module 200D, a wireless communications interface module 200E, a system memory 200F, an optional touch screen input 200G, an optional firmware 200H and/or an optional electronic media read/write module 2001. The electronic media read/write module 2001 and an electronic media 1902 are selected to enable reading and writing of the ebook 2 to and from the editing system 200. Within the eletronic media 1902 is the ebook 2. The editing system software SW.5 enables the editing system 200 to the perform the aspects of the invented method as disclosed herein in the Figures and accompanying text. The network 1900 may be or comprise the Internet, a telephony network, and/or other computer electronic communications network.

FIG. 20 is a schematic diagram of an ebook reader 4. The ebook reader 4 may be or comprise (a.) a KINDLE ebook reader as marketed by Amazon, Inc. of Seattle, Wash.; (b.) a NOOK ebook reader as marketed by Barnes & Noble, Inc. of New York, N.Y.; (c.) an IPHONE™ cellular telephone as marketed by Apple, Inc. of Cupertino; (d.) an IPAD™ tablet computer adapted for generation of digitized photographic documents and capable of bi-directional communications via the telephony network and the Internet 6 as marketed by Apple, Inc. of Cupertino, Calif.; (e.) an HTC TITAN H™ cellular telephone as marketed by AT&T, Inc, of Dallas, Tex. and running a WINDOWS 7 ™ operating system as marketed by Microsoft Corporation of Redmond, Wash.; (f.) a GALAXY NEXUS™ smart phone as marketed by Samsung Group of Seoul, Republic of Korea and running an ANDROID™ operating system as marketed by Google, Inc, of Mountain View, Calif.; (g.) a TOUGHPAD™ tablet computer as marketed by Panasonic Corporation of Kadoma, Osaka, Japan and running an ANDROID™ operating system as marketed by Google, Inc. of Mountain View, Calif.; or (h.) other suitable text display system known in the art.

The ebook reader central processing unit 4B is bi-directionally communicatively coupled by a reader communications bus 4H to a display module 4C and the touch screen display 5, a reader input module 4D, a reader wireless communications interface module 4E, the reader system memory 4A, an optional firmware 4F and/or an optional reader electronic media read/write module 4G. The electronic media read/write module 4G and the electronic media 1902 are optionally selected to enable reading and writing of the ebook 2 to and from the ebook reader 4. The ebook reader system software SW.1 enables the ebook reader 4 to perform the aspects of the invented method as disclosed herein in the Figures and accompanying text. A first GUI software SW.6 enables the first user interface and process of FIG. 15 and the user interaction as disclosed in the accompanying text. A second GUI software SW.7 enables the process of the second UI of FIG. 16 and the user interaction as disclosed in the accompanying text.

One skilled in the art will recognize that the foregoing examples are not to be taken in a limiting sense and are simply illustrative of at least some of the aspects of the present invention.

I claim:

1. A method comprising:
entering a source digitized text into a memory of an information technology system;
delineating the source digitized text into a plurality of segments by a user;
associating a first selection of the segments by the user with a first tag;
individually assigning by the user a unique sequence number to each segment of the first selection, whereby each segment of the first selection is associated with a unique sequence number within the first selection;
associating a second selection of the segments by the user with a second tag;
individually assigning by the user a unique sequence number to each segment of the second selection, whereby each segment of the second selection is associated with a unique sequence number within the second selection;
receiving a user command to proceed to thereafter sequentially render segments associated with the first tag;
generating a first node record and associating the segments associated with the first tag with the first node record;
associating the first node record with at least one other selected segment associated with the second tag when at least one of the segments associated with the first node record shares the second tag;
sequentially rendering each segment associated with the first tag node record in accordance with the order of each individually assigned sequence number of each segment of the first selection until the associated selected segment is rendered;
receiving a user command to sequentially render segments associated with the second tag;
generating a second node record and associating segments associated with the second tag with the second node record;
sequentially rendering segments associated with the second node record in accordance with the order of each individually assigned sequence number of each segment of the second selection.

2. The method of claim 1, wherein the source digitized text is previously generated.

3. The method of claim 1, wherein at least one additional segment of the segments is associated with both the first tag and the second tag.

4. The method of claim 1, wherein at least one segment of the segments is associated with both the first tag and a third tag.

5. The method of claim 4, wherein a sequential association of the first selection of the segments is one-dimensional.

6. The method of claim 1, further comprising forming a first thread by sequentially associating the first selection of the segments.

7. The method of claim 1, wherein a one-dimensional sequential association of the first selection of the segments is along a time line.

8. The method of claim 1, wherein the first tag is associated with a user selected aspect of the source digitized text.

9. The method of claim 1, wherein the first tag is associated with an aspect of an aspect group including a character, a scene, a plot line and an ordered sequence of segments.

10. The method of claim 1, wherein the first selection of the segments is user defined.

11. The method of claim 1, wherein a first segment and a second segment at least partially comprise substantively identical digitized text.

12. The method of claim 1, wherein a delineation of the source digitized text into segments provides overlapping inclusion of text of the source within at least two segments.

13. The method of claim 1, further comprising enabling an alternate user to direct the information technology system to sequentially render the segments.

14. An ebook device comprising:
a command and selection input module, the input module adapted to accept and digitize user commands and user selections;
a processor communicatively coupled with the input module, the processor adapted to receive digitized user commands and user selections from the input module;
a memory communicatively coupled with the processor and comprising an ebook reader and at least one ebook, the ebook comprising digitized text separated into a plurality of textual segments;
a display screen, the display screen communicatively coupled with the memory and adapted to render digitized text of the ebook segments; and
the ebook comprising:
a first plurality of segments of the textual segments comprising digitized text and associated with a first tag, wherein each segment of the first plurality of segments is assigned a unique sequence number by a user;
a second plurality of segments of the textual segments associated with a second tag, wherein each segment of the second plurality of segments is assigned a unique sequence number by the user, and wherein at least one segment of the textual segments is associated with both the first tag and the second tag and the at least one segment of the textual segments is included within both the first plurality of segments and the second plurality of segments;
and
logic directing the processor to perform the following rendering at the display screen:
execute upon receipt a user command to sequentially render segments associated with the first tag;
generate a first node record and associate the segments associated with the first tag with the first node record;
associate the first node record with at least one other selected segment associated with the second tag when at least one of the segments associated with the first node record shares the second tag;
sequentially render each segment associated with the first node record in accordance with the order of each individually assigned sequence number of each segment of the first selection until the associated selected segment is rendered;
execute upon receipt a user command to sequentially render segments associated with the second tag;
generate a second node record and associate segments associated with the second tag with the second node record;

sequentially render segments associated with the second node record in accordance with the order of each individually assigned sequence number of each segment of the second selection.

15. The device of claim 14, wherein the first plurality of segments is sequentially associated.

16. The device of claim 15, wherein the sequential association of the first plurality of segments is one-dimensional.

17. The device of claim 15, wherein a one-dimensional sequential association of the first plurality of segments is along a time line.

18. The device of claim 14, wherein the first tag is associated with a user selected aspect of the textual segments.

19. The device of claim 14, wherein the first tag is associated with an aspect of an aspect group including a character, a scene, a plot line and an ordered sequence of segments.

20. The device of claim 14, wherein a first segment and a second segment at least partially comprise identical digitized text.

21. The device of claim 14, wherein a delineation provides overlapping inclusion of a source digitized text within at least two segments.

22. The device of claim 14, wherein the ebook reader is adapted to enable the display screen to sequentially render the first segment and the second segment.

23. The device of claim 22, wherein the ebook reader is adapted to indicate all tags associated with a selected node record, wherein the selected node record is associated with at least two tags of a plurality of tags and at least two segments of the textual segments.

24. A non-transitory tangible computer-readable medium comprising software coded instructions that direct an ebook device to perform the following aspects:

store a source digitized text in a memory, the source delineated into a source plurality of segments, wherein a first plurality of the segments is associated with a first tag and each segment of the first plurality of the segments is assigned a unique sequence number by a user, and a second plurality of the segments is associated with a second tag and each segment of the second plurality of the segments is assigned a unique sequence number by the user, wherein at least one node is associated with both a first segment associated with the first tag and a second segment associated with the second tag;

execute upon receipt a user command to sequentially render segments associated with the first tag;

generate a first node record and associate the segments associated with the first tag with the first node record;

associate the first node record with at least one other selected segment associated with the second tag when at least one of the segments associated with the first node record shares the second tag;

sequentially render each segment associated with the first node record in accordance with the order of each individually assigned sequence number of each segment of the first selection until the associated selected segment is rendered;

execute upon receipt a user command to sequentially render segments associated with the second tag;

generate a second node record and associate segments associated with the second tag with the second node record;

sequentially render segments associated with the second node record in accordance with the order of each individually assigned sequence number of each segment of the second selection.

* * * * *